United States Patent [19]

MacDoran et al.

[11] Patent Number: 5,757,916
[45] Date of Patent: May 26, 1998

[54] METHOD AND APPARATUS FOR AUTHENTICATING THE LOCATION OF REMOTE USERS OF NETWORKED COMPUTING SYSTEMS

[75] Inventors: Peter F. MacDoran, Boulder; Michael B. Mathews, Louisville; Fred A. Ziel; Kenn L. Gold, both of Boulder; Steven M. Anderson; Mark A. Coffey, both of Louisville, all of Colo.; Dorothy E. Denning, Arlington, Va.

[73] Assignee: International Series Research, Inc., Boulder, Colo.

[21] Appl. No.: 540,391

[22] Filed: Oct. 6, 1995

[51] Int. Cl.$^6$ ............................................... H04L 9/00
[52] U.S. Cl. ............................................. 380/25; 380/23
[58] Field of Search ........................... 342/357; 380/23, 380/25; 340/825.34

[56] References Cited

U.S. PATENT DOCUMENTS

| | | | |
|---|---|---|---|
| 4,797,677 | 1/1989 | MacDoran et al. | 342/357 |
| 4,860,352 | 8/1989 | Laurance et al. | 380/23 |
| 5,226,079 | 7/1993 | Holloway | 380/25 |
| 5,231,666 | 7/1993 | Matyas | 380/25 |
| 5,483,597 | 1/1996 | Stern | 380/25 |
| 5,581,615 | 12/1996 | Stern | 380/25 |

*Primary Examiner*—Salvatore Cangialosi
*Attorney, Agent, or Firm*—Dorsey & Whitney LLP

[57] ABSTRACT

A method and apparatus for authenticating the identity of a remote user entity where the identity of such user entity is authenticated by use of information specific to geodetic location of the user entity but that changes constantly, making "spoofing" the host device extremely difficult. The invention is preferably implemented utilizing satellite positioning technology to produce the identifying information.

28 Claims, 9 Drawing Sheets

FLOW CHART OF LSS SOFTWARE

FLOW CHART OF HOST SERVER SOFTWARE

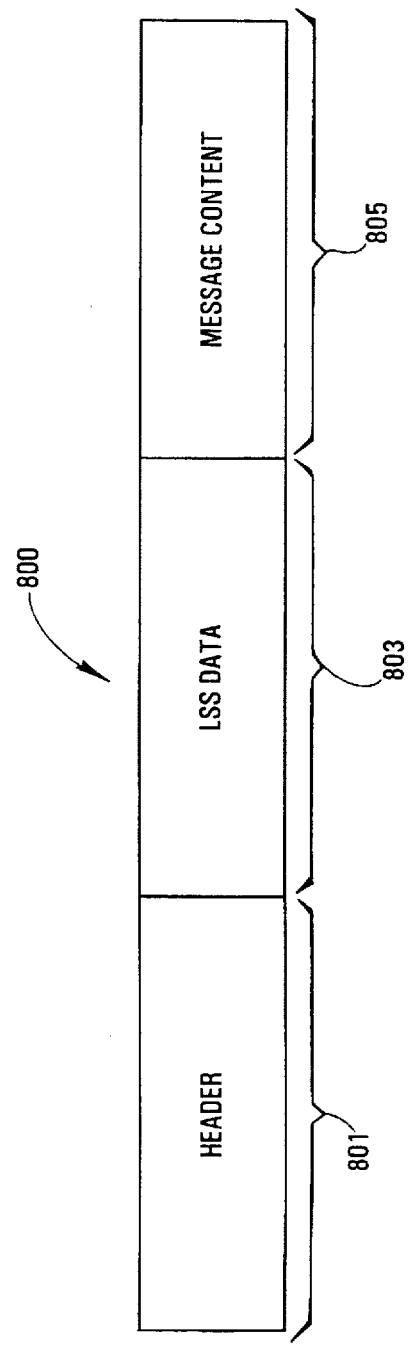

METHOD AND APPARATUS FOR AUTHENTICATING THE LOCATION OF REMOTE USERS OF NETWORKED COMPUTING SYSTEMS

TECHNICAL FIELD

This invention relates to a method and apparatus for authenticating the identity of a remote electronic device user (or client) seeking electronic access to, or seeking to perform an electronic transaction with, a host device. Specifically, this invention relates to a method and apparatus for authenticating the identity of a remote electronic device where the identity of such electronic device (or client) is authenticated by use of information specific to the device's geodetic location but that changes constantly, making "spoofing" the host device extremely difficult. The invention is preferably implemented utilizing satellite positioning technology to produce the identifying information.

BACKGROUND ART

In order to determine whether a person or device attempting to access or perform a transaction with a host computer system is a person or device entitled to access, most host computer systems require the person or device to provide information confirming identity. This process is called user authentication. In the prior art, user authentication has been based on the following kinds of information:

1. Information the user knows. This has been the most common mode of authentication. Examples are passwords (or pass-phrases) and personal identification numbers (PIN's). Cryptographic methods for authentication (including one-time passwords and challenge-response protocols) also fall into this category when implemented in software or hardware. Here the information possessed by the user is either a code key or, more likely, a PIN or password that provides access to the key (which is typically a user-unfriendly random bit string). For example, the keys used with Pretty Good Privacy (PGP) are stored in files encrypted under user-selected passphrases.

2. An object the user possesses. Examples are access tokens, physical keys, smart cards, PCMCIA cards, and other hardware devices, including cryptographic devices and one time password generators. Dial-back mechanisms also fall in this category—the possessed object is a phone line with a specific number. Cryptographic devices are typically used with PIN's to control activation of the devices. For example, the Fortezze PCMCIA cryptographic card requires a 4-digit PIN for activation.

3. A personal characteristic. Examples are biometric characteristics, including finger and thumb prints, hand geometry, voice prints, retinal scans, and keystroke patterns. Handwritten signatures fall into this category, although they might also be viewed as based on information the user knows.

None of these prior art methods is foolproof. Passwords and PIN's are often vulnerable to guessing, interception (e.g., by sniffer programs on networks), and brute force search. Users frequently write down passwords and PIN's in places that are not physically protected. Hardware or other physical objects can be stolen, and phone lines hijacked. Cryptographic systems can fail even when the algorithms are strong. Typically, their security reduces to that of PIN's and passwords or, in the case of physical devices, possession of the device. Biometric characteristics can lead to false positives (permitting unauthorized users) and false negatives (denying legitimate access). Most such characteristics are vulnerable to interception and (because they do not normally change over time) replay of the intercepted data by masqueraders.

A method and apparatus for protecting against unauthorized access that solves the preceding problems and provides a greater degree of security against unauthorized access would be a useful advance over the prior art.

SUMMARY OF THE INVENTION

A system for determining the authenticity of a client seeking access to a host has a client authentication means, with a first sensor associated with the client for sensing transmissions from two or more signal sources that produce transmissions from which a state vector (latitude, longitude, height, velocity (if any)) for the client location can be derived. This first sensor includes means for converting the sensed transmissions into first state vector observations having a format suitable for communication to an authentication server associated with the host. The client authentication means also has means for communicating the first state vector observations to the authentication server. Also part of the system is a host authentication processor communicating with the authentication server. This processor has authentication means for receiving the first state vector observations and for comparing one or more attributes of the state vector contained in the first state vector observations to predetermined authentication criteria, and means for developing a user authentication signal when the one or more attributes of the first state vector observations satisfy the predetermined authentication criteria. While the client may be a remote computer system user and the host a central computer system that the remote user seeks to access, the authentication system is applicable to many other situations where a client device seeks to establish authenticity for itself or a message it is sending.

It is therefore an object of the present invention to provide for a novel and improved method and apparatus for authenticating the location of a remote client user of networked computing systems by requiring the remote client to provide a location signature obtained by a Global Positioning System (GPS) sensor.

It is another object of the present invention to authenticate the position and velocity of fixed or moving remote client users by employing GPS sensor devices, utilized as location signature sensor (LSS) devices, to intercept spread spectrum signals from a plurality of Earth-orbiting satellites (with or without knowledge of the code sequence used by the satellites) and provide the GPS data as a location signature.

It is a further object of the present invention to provide a device at a host system that performs centralized digital signal processing on information provided by LSS devices in order to perform location determinations for initial location registration and to perform subsequent authentications of remote users, with or without knowledge of the satellite codes.

It is still another object of the present invention to provide a method for labelling electronic messages with location signature information developed by LSS devices for authentication of the message by a subsequent recipient.

These and other objects of the present invention will become clearer in the description of the preferred embodiment below and the figures referenced therein.

BRIEF DESCRIPTION OF THE DRAWINGS

FIG. 8 is a block diagram showing the basic components of an LSS message with which a location signature in accordance with the present invention has been associated.

Figure 1:
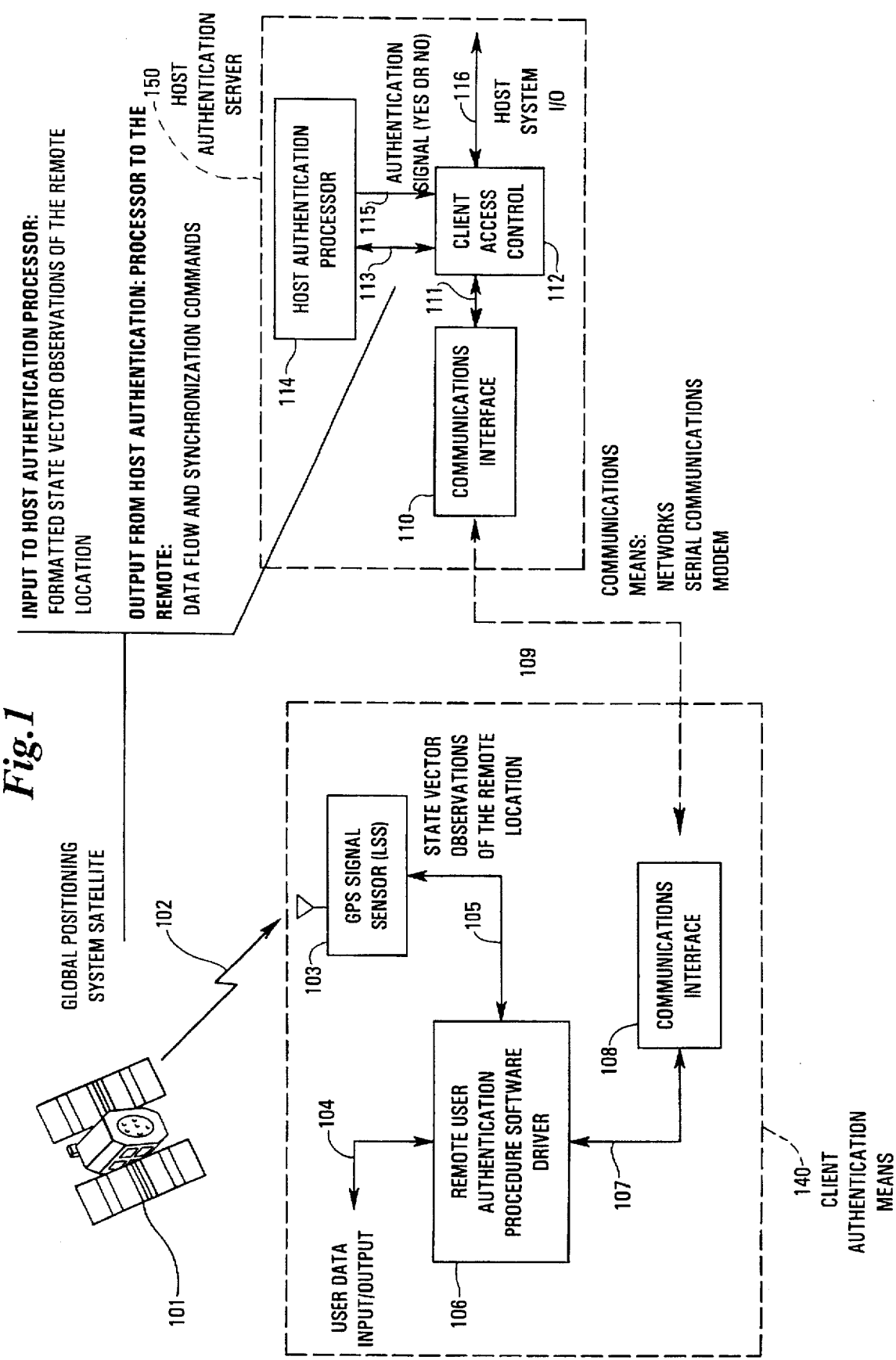
FIG. 1 is a schematic diagram of the present invention in an embodiment where only the client entity captures and provides information from a LSS for the host's authentication process.

The above and other objects of the present invention will become more readily appreciated and understood from a consideration of the following detailed description of a preferred embodiment when taken together with the accompanying drawings.

DETAILED DESCRIPTION OF THE PREFERRED EMBODIMENT

I. Background of GPS

For purposes of the present invention, the following introduction to the GPS is useful. The NAVSTAR Global Positioning System of the U.S. Air Force is made up of a plurality of Earth-orbiting, signal-transmitting satellites that emit spread spectrum signals in accordance with a set of prescribed codes. (See "GPS Signal Structure and Performance Characteristics", J. J. Spilker, Navigation, Institute of Navigation, ISBN 0-0936406-00-3, Vol. No. 2, Summer, 1978 and "The Global Positioning System, A Shared National Asset", National Academy Press, Washington D.C. 1995.)

The GPS is composed of three principal segments that are described as space, control and user. The space and control segments are the primary responsibility of the U.S. Air Force. The user segment has both military and civilian suppliers.

a. NAVSTAR/GPS Space Segment

The space segment is presently a twenty-five satellite constellation consisting of 24 Block II or IIA operational satellites and one surviving Block I prototype space vehicle, which is more than 10 years old. Each of the space vehicles of the constellation is in a 12 hour period orbit with a once per day repeating ground track. The satellite constellation is arranged in six orbital planes inclined at 55 degrees. In 1994, the constellation was declared to be operational, indicating that at least 24 space vehicles of Block II and Block I satellites were present to provide 3-D global positioning on a nearly continuous basis. The operational satellites are equipped with the capability known as selective availability/anti-spoof (SA/A-S) which is the methodology by which the U.S. Department of Defense can degrade and/or deny access to the GPS signals by receivers that are not authorized for U.S. or allied military users. There are two transmitted bands from each satellite, designated as L1 (1575.42 MHz) and L2 (1227.60 MHz), which are derived from multiply redundant atomic clocks on-board each satellite. The time maintained aboard the satellites is synchronized relative to master clocks located at the U.S. Naval Observatory in Washington, D.C. and the National Institute for Standards and Technology in Boulder, Colo. GPS time is traceable to the atomic time scale, A.1, and to Universal Time Coordinated (UTC). Within the L1 band are two channels, a narrowband channel occupied by the C/A code and a wideband channel that is intended for precision measurements and is occupied by either an unclassified P code or a classified Y code. The L2 band contains only the P or Y codes and serves mainly to act as an ionospheric effects calibrator for the L1 band. In very general terms, the C/A code portion of the L1 band is the channel intended for civil use and the wideband portion of L1 and the entire L2 are for military use.

b. Control Segment

The Control Segment is responsible for the overall management of the satellite constellation. In addition to maintaining the health of the satellites, the main function of the Control Segment from the user's perspective is the determination of the orbit elements and the estimation of the time and frequency parameters for every satellite. In order to determine these satellite orbit and clock parameters, there is a network of five globally deployed ground monitor stations located at Hawaii, Kwajalein, Diego Garcia, Ascension and Colorado Springs, Colo., which functions as the Master Control Station (MCS) operating from Falcon AFB. Each of these monitor sites is well known in the World Geodetic System (WGS 84), Earth-centered, Earth-fixed coordinate system, and is equipped with an atomic clock to operate the monitor site GPS receiver. Data obtained from each of these monitor sites is transferred to the MCS, which performs a simultaneous estimation of the orbit elements and atomic clock states for each of the satellites of the constellation. Once those parameters are determined by the MCS, they are uploaded into the satellites for storage and subsequent dissemination in a 50 bit per second telemetry message that is a part of the L1 and L2 transmissions.

c. User Segment

The user segment refers to the actual receivers that make use of the L-band microwave transmissions from the GPS satellites. In the very simplest form, a GPS receiver consists of a method for matching the unique code transmitted by each satellite. By using a receiver internal clock, the receiver determines the relative time shift of the code needed to achieve that match, a process termed code correlation. In general terms, all the satellites are time synchronized to each other and emit the codes at a common epoch. The GPS receiver, relative to its internal clock records the apparent time of arrival of event marks within the received codes and derives a biased estimate of the time shift from itself to each satellite to form the quantity known as a "pseudo range."

The term "pseudo" is used to denote the fact that the initially measured ranges are all false, because the clock internal to the GPS receiver is in general not synchronized to GPS satellite time. The receiver's function is, of course, to produce positional information (latitude, longitude and height). It does this by receiving pseudo ranges from four or more GPS satellites, so that four or more observations are available to solve for the four unknowns; three position terms and one receiver clock term. Within the 50 Hz message from each satellite is orbital information previously uploaded by the Control Segment that allows the user receiver to calculate the geocentric position and velocity of the satellite being received. That message also contains individual satellite clock parameters so that the time of flight of the codes from the satellite to the receiver can eventually be interpreted as range. The four or more GPS satellites must be well distributed across the sky in a geometric sense for this simultaneous estimation process to function accurately. The necessity to estimate the clock parameter of the receiver also enables an important additional benefit of GPS, that of precise time transfer.

The accuracy with which this process proceeds can be affected by a variety of errors, some that are natural consequences of physics, such as the transmission media of the troposphere and ionosphere and some from the inability of the MCS to accurately forecast orbital elements and clock states of the satellites. However, there are some other errors whose source is intentional degradation of unauthorized receivers. This degradation is implemented by the methods of selective availability (SA) to distort orbit elements, satellite clock information and introduce dither to the pseudo ranging. Because of the concern that an adversary could counterfeit signals such as the unclassified P code and thereby spoof receivers into improper operation, the Department of Defense design utilizes a classified Y code to control access to the full accuracy of GPS. When the Y code is introduced into the wideband channel, P code receivers will fail to acquire any data. The transition from P code to Y code is known as anti-spoof (A-S).

The signals being made available to the civil community are termed the Standard Positioning Service (SPS), with accuracy limited to 100 m, 2-d RMS. Signals intended for military use are termed the Precise Positioning Service (PPS) and have an accuracy of 21 m, 2-d RMS. During the many years of the GPS development phase, the wideband channel used the unclassified P code. The civil community became eager users of P code receivers and found many applications for their precision and accuracy. However, the operational satellite constellation has made the transition from transmitting the P code in the wideband channel to transmitting the classified Y code. As a point of fact, the U.S. Department of Defense had consistently stated, for more than 10 years, that the P to Y transition would occur and, thus, the P code would no longer be available to civil users. Understandably, the civil community was very reluctant to give up those P code advantages and suffer the loss of their investment in that expensive equipment.

Even without the imposition of SA/A-S on the GPS signals, high precision GPS operations have never found PPS performance of 20 meter accuracy to be of any value. Where the accuracy requirements have been for decimeters to millimeters, it has always been necessary to employ differential GPS (DGPS) methods, in which the independent observations of GPS transmissions received at two separate receiver locations are combined in the calculation of location.

The principal motivation for DGPS methods stems from the fact that operating in a single receiver mode results in a one-to-one mapping of orbit and clock errors into the derived receiver position. In a very general sense, satellite orbit errors of 10 m and clock errors of 30 nsec both result in approximately 10 meters of positioning error. Where there is a need for positioning quality of 1 to 100 mm, no single receiver pointing options are possible, because the GPS constellation orbits cannot be determined by any method to that same 1 to 100 mm accuracy. Another issue is the stability and accuracy of the on-orbit atomic clocks to be commensurate with 1 to 100 mm positioning accuracy. This requires synchronization maintenance to better than 0.3 nanosecond.

The methodology of differential DGPS has been developed to allow common mode cancellation of these major error sources, such as satellite clock instabilities, including the SA imposed intentional pseudo range dither effects. In the case of the orbit error source, DGPS affords attenuation with a magnitude dependent upon the baseline separation between the two receivers. The attenuation of the orbit error is proportional to the ratio of the baseline length to the height of the GPS satellites, which are at altitudes of approximately 20,000 km. As an example, for a baseline separation of 100 km between a pair of receivers, a 50 m on-orbit error in the broadcast message, perhaps imposed by SA policy, would contribute a 25 cm baseline measurement error. In the absence of SA, the MCS appears to have a 5 to 10 m accuracy in determining the satellite orbits. Employing DGPS also accomplishes transmission media error attenuation because the troposphere and ionosphere tend to be similar on scales of 1 to 30 km. By explicit differencing of pseudo ranges, the transmission media effects tend to cancel out, and for decimeter accuracy, no explicit transmission media calibrations are required. However, for high accuracy surveys where centimeter accuracy is needed, explicit calibrations for the ionosphere are required. L1 and L2 pseudo ranging and carrier phase data extraction meet that goal. Algorithms have been developed to use low elevation angle data to derive the tropospheric parameters.

U.S. Pat. No. 4,797,677, titled "Method and Apparatus for Deriving Pseudo Ranging from Earth Orbiting Satellites," naming as inventors: P. F. MacDoran and D. J. Spitzmesser, issued 29 Jan. 1989 (and incorporated herein by reference), describes a system for deriving pseudo range without knowledge of the code sequence of modulation carried by the GPS signals. Thus, it has been shown that both code-correlating and codeless methods can be used to derive position information from GPS data. With either approach, the GPS user's goal is to capture GPS information and determine from it a "state vector." The "state vector" is a description of the physical location of a particular object with reference to some frame of reference, usually Earth-centered. Preferably, the state vector will include not only location in three dimensions, but also the object's velocity and acceleration (if any). It may also include additional information regarding the electronic attributes of the device (sensor) that is receiving the GPS data, e.g., oscillator frequency offset, internal range bias and data latency.

II. Overview of Invention a. General Principles

To provide a foundation for the following discussion of the invention, it is useful to define certain basic terms to be used:

"Entity" means an electronic device, typically a computer or network system that has means to be externally connected to other electronic devices, including gateways, remote computers, modem host servers, etc. This definition does not extend to individual users that operate an entity, because the invention does not have the ability to authenticate an individual person.

"Client" means an entity requesting access or services from a host entity that will not provide the access or services without authentication of the client. Usually, the client is "remote" from the host, but in some cases the physical distance is small and the remoteness signifies an administrative distinction between host and client.

"Host" means an entity providing access or services; typically a client requests access to the host. The host is protected by a host authentication server that responds with a request for authentication information from the client.

"State vector observations" means certain GPS data that is captured by an LSS device and processed to make it suitable for communication and further processing. State vector observations are "raw" in the sense that while the directly received GPS transmissions have been processed somewhat (e.g., compressed), the observations have not been resolved into a state vector.

In the present invention, codeless GPS signal processing techniques have been adapted to implement a method and apparatus by which it is possible to receive GPS signals from all satellites above the horizon and perform a compression of the spectra from the satellites by nearly a factor of one million to one and then to digitally format and buffer these raw data in a form described as digital state vector observations. State vector observations developed at a client can be transferred to a host authentication server upon being challenged by the host. (The spectral compression is necessary for efficient communication of the state vector observations over the relatively slow communication lines commonly used.) The host then performs the processing to a state vector that reveals the remote client location.

The present computer network security invention authenticates by client location. In the mode of fixed site-to-site usage, each site is essentially an enclave. The client enclave is a geodetic location that is authenticated to a host, and traditional security methods (i.e., guards checking badges) are employed to verify who is physically allowed access into the enclave. PIN's or forms of encryption can always be used with the system. Thus, if a fraudulent act issues from an authenticated enclave, the enclave location of the bad actor is immediately revealed. If someone was using an unauthorized PIN and/or transaction encryption, then the enclave principle of a "collection of trusted individuals" has been violated. There are, of course, conventional methods for discovering the responsible party and dealing with violations of trust within a limited set of individuals. These are outside the scope of this invention.

This invention involves a methodology for generating one-time locational signatures (passwords) to authenticate the location of a client at log-in, before permitting the client to gain access to a host, such as a LAN, enterprise network or distributed database. In contrast to existing random digit signature generators, this invention utilizes the client's geodetic location as the basis for initial registration of the client and for subsequent log-in authorizations for access to a host computer network or other protected enclave. The geodetic location (latitude, longitude, and height), derived from multiple microwave satellite signals of the GPS, is the remote client's key to forming an acceptable signature. Every location on Earth has a unique situation for formation of a signature created from transmissions from multiple satellites at any given instant in time.

There are two primary components to the invention:

(1) the location signature sensor (LSS) that develops state vector observations;

(2) the authentication processor for processing state vector observations and determining authenticity of a client attempting access to a host.

The basis for signature generation at the client LSS is the state vector or location coordinates (latitude, longitude, and height) of the client. There can be no expectation that such locational details can be held as secure information. However, because the GPS satellites' signals are continuously changing relative to the client and host sites, the state vector observations from an LSS at either site are also continuously changing. The host site, protected by the host authentication server, challenges a client seeking access to transmit the state vector observations of the client's LSS. Upon receiving these, the authentication processor solves for the state vector (usually, latitude, longitude, and height) of the LSS device at the client site by processing into a state vector the GPS state vector observations transferred from the client to the host authentication server. The authentication processor at the host then applies its predetermined authentication criteria to the state vector to determine authenticity. Where the state vector is latitude, longitude and height, the authentication criteria used by the host will typically be the latitude, longitude and height of all authorized clients, together with some proximity criteria. Thus, there may not be an exact match between the state vector developed from the client's state vector observations and the predetermined authentication criteria. The proximity criteria define "close enough," based on the particular host's security requirement.

Simply transferring the client's position (latitude, longitude and height), will not gain a client access into the host system. Therefore, preexisting knowledge of a remote client's geodetic location is of no utility to potential unauthorized users. If the LSS device is stolen, it cannot be used in a different location in order to gain access. In this case, the geodetic location derived from the stolen LSS device will not match the location stored with the host authentication server and will fail the position threshold test. Not only will system access be denied, but the location of the fraudulent party can then be known and can be passed to law enforcement.

The signature pattern from an LSS cannot be intercepted at one time and used at a later time in order to gain access. Because of the dithering of the GPS signals by the U.S. Department of Defense, the pattern created by up to 12 different satellite signals arriving at any given location is constantly changing on a millisecond by millisecond basis and details of the combined multiple satellite transmissions are unique to every point on Earth. A location signature that is even 5 milliseconds old will be completely useless for spoofing the system and will result in a failure to gain access or a terminated computer connection. In five milliseconds the state vector will change by approximately 4 meters, which for high security applications may well be outside the 1 meter accuracy that could be imposed by authentication criteria.

A key advantage of the system is that it simplifies the conventional password system for management for network systems, in several ways.

i. The location authentication process within the system can be transparent to system users (functions without the knowledge of or interaction by the user).

ii. There are no traditional passwords or PIN's for users to remember and periodically change or for administrators to manage.

iii. User location information does not need to be protected, because the constantly changing LSS device authentication parameters are the password.

iv. Encryption of the password is not required, because it is continuously changing, everywhere unique, and non-repeating.

v. Because the system does not rely on encryption technology, no administratively burdensome key management is required.

The invention is an alternative to random password generators and will complement data encryption systems that are in current use. In addition, cryptographic systems are governed by strict export controls. The present system has no requirement for data encryption; although, for certain applications, a user may desire to encrypt authentication criteria or the communications channel that is used during and after authentication.

As noted above, the authentication processor at the host applies predetermined authentication criteria, which will include proximity criteria. The proximity criteria are affected by two primary factors. First, the proximity criteria must take into consideration the accuracy limitations of the state vector observations and of the authentication processor's computations to develop state vectors. Second, the proximity criteria must take into consideration the security requirement. To be authenticated, must the client be located in a particular city, a particular city block, a particular office building or a particular office in the office building? Must the LSS be located in a particular corner of a particular office window?

Depending on the proximity criteria, a DGPS process may be used, because it permits higher accuracy of state vector determination due to common mode cancellation of major errors sources. But DGPS requires state vector observations from two LSS's, one located at the client and the other associated with (and usually located at) the host. Thus, there are cost implications to DGPS. Whether or not DGPS is used to increase accuracy of state vector determination, the choice between code-correlating or codeless technology will also affect accuracy. With codeless technology, there is access to the P(Y) signal transmissions and higher precision is available. In a civilian application environment, conventional code-correlation technology only provides access to C/A code pseudo ranging. The inherent precision of a C/A receiver's state vector observations are typically five to ten meters when processed in a DGPS mode, compared to sub-meter precision for codeless mode processing with access to the P(Y) channel.

DGPS processing is desirable not only because of the greater opportunities for higher precision but because the two separate state vector observations make spoofing more difficult. It is therefore preferable, from a security viewpoint, to use DGPS. In addition, with either DGPS or the approach using state vector observations from a single LSS at the remote client site, the codeless approach is preferable, because its implementation is simpler and results in a more fundamentally raw form of state vector observations being sent to the host.

For fixed client sites, the authentication criteria applied at the host can be established in a variety of ways. Client site GPS data or map measurements can be provided to a host authentication server database before the first client log-in is attempted. Another possible approach for many situations is to perform a log-in registration process where reliable personnel at the client site ensure security and valid state vector observations at that end. Log-in registration thus proceeds by having the host authentication server ask the remote client to provide a set of state vector observations. These are processed at the host authentication server into a state vector that is stored in an authentication criteria table as the required location signature for that client. Following this log-in registration, the stored location signature is always used as the authentication criteria (along with whatever proximity criteria have also been established).

Using the authentication techniques of the present invention adds minimal time overhead to a client-host exchange: (a) about 2 minutes for a typical initial site log-in registration; and (b) a few seconds for normal authentication, to include data transmission from the client and processing at the host. The host authentication server will indicate authentication in process and indicate when the client's LSS data have been received, processed into a possible geodetic location signature and tested for correspondence with the authentication criteria, typically a table containing the latitude/longitude/height coordinates of "authorized clients." For reasons of overall system security, it is probably advisable to encrypt the file that contains the geodetic positioning or other authentication criteria for the authenticated clients.

b. Introduction to Components

Figure 2:
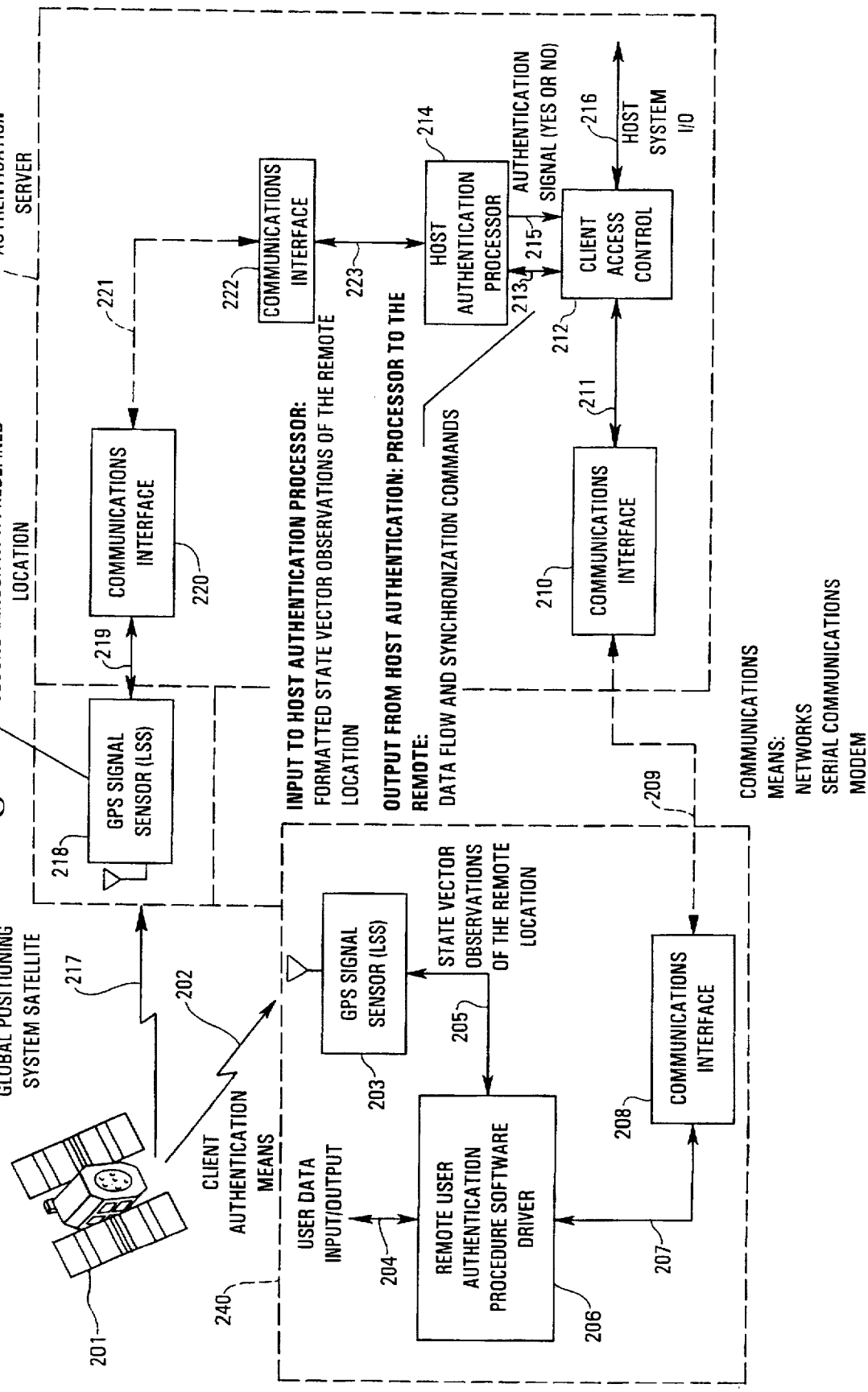
FIG. 2 is a schematic diagram of the present invention in an embodiment where both the client entity and the host entity have a LSS that provides LSS information for the host's authentication process.

As a general introduction to the more detailed description of implementation of the present invention in an embodiment using a single LSS at the client site and another embodiment using an LSS associated with the host as well as the LSS at the client site, reference is made to FIGS. 1 and 2.

In FIG. 1, spread spectrum microwave signals 102 from the GPS satellites 101 which are above the horizon and transmitting (for simplicity, only one satellite is shown in FIG. 1) arrive at client authentication means 140, being sensed by an LSS 103 equipped with a microwave L-band antenna. LSS 103 is located at the remote client site and contains GPS signal sensor and processing circuits (as described in greater detail below) that produce digitized state vector observations 105. The preferred form of the client authentication means 140 has the necessary driver hardware and firmware 106 to format and send digital packets containing the state vector observations through a channel 107 and a communications interface 108, onto a communications channel 109, upon being challenged by the host authentication server 150, such as that illustrated in FIG. 5 to be hereinafter described. At the host authentication server 150, a communications interface 110 transfers the received state vector observation digital packets on channel 111 to the client access control module 112 for signal processing (to be described later) and authentication verification by authentication processor 114 in order to grant or deny the client access to the channel 116 to the host system (not shown). The access control module 112 communicates with the authentication processor 114 on channel 113, receiving the authentication signal on line 115. If authentication is successful, client user data 104 are passed by driver 106 and communications interface 108 onto channel 109, to pass through the access control module 112 and reach the host on channel 116.

In contrast to FIG. 1, FIG. 2 shows a system in which GPS data are captured at two separate locations, making DGPS location processing possible. In FIG. 2, spread spectrum microwave signals 202 and 217 from the GPS satellites 201 which are above the horizon and transmitting (again, for simplicity, only one satellite is shown in FIG. 2) arrive at client authentication means 240 and host authentication server 250, being sensed by LSS 203 and LSS 218, respectively. Each LSS is equipped with a microwave L-band antenna and has GPS signal sensor and processing circuits that produce digitized state vector observations. In its preferred form, LSS 203 has the necessary hardware and firmware 206 to format and send digital packets containing the state vector observations 205 through a channel 207 and a communications interface 208 onto a communications channel 209 upon being challenged by the host authentication server 250, such as that illustrated in FIG. 5 and to be hereinafter described. At the host authentication server 250, a communications interface 210 transfers the received state vector observation digital packets on channel 211 to the client access control module 212 for signal processing (to be described later) and authentication verification by authentication processor 214 in order to grant or deny the client access to the channel 216 to the host system (not shown). The access control module 212 communicates with the authentication processor 214 on channel 213, receiving the authentication signal on line 215. In addition, the host authentication server 250 receives state vector observations via channels 219, 221, and communications interfaces 220, 222 from LSS 218, which is under host control.

The host processing functions illustrated in FIG. 2 provide for the possibility that the two LSS devices 203, 218 could both be remote from the host authentication server 250. For example, a remote client on the other side of the Earth from the host authentication server 250 would have few satellites in common view with the host authentication server 250. Therefore, it is advantageous to place LSS 218 at a site other than the host that has a reasonable amount of common view satellites relative to LSS 203 at the remote client. In that manner, the location of LSS 203 is determined relative to the location of LSS 218, with raw GPS data from each source communicated via channel 209 and channel 223, respectively, for authentication processing in authentication processor 214.

In sum, the apparatus and methodology of the present invention allow a remote client to use a complex set of raw satellite observations to create a digital location signature that is transferred to a host authentication server, upon being challenged by the host authentication server. The host authentication server then employs digital signal processing and multi-parameter simultaneous estimation methods to derive the three dimensional vector separation between the remote client and host authentication server sites. If the digital response transferred from the remote client can be processed into a location signature that matches the previously registered authentication criteria, then access to the host is granted. However, if the remote user is unable to respond with appropriate raw digital GPS data or responds with raw signature data which does not process to the predetermined authentication criteria, the host authentication server denies host access.

It may be noted that the processing of LSS data to derive positioning is similar to a land survey application. In the U.S. Pat. No. 4,797,677 the codeless methodology was utilized to create a land survey product (Model 2002 manufactured by ISTAC Inc. in Pasadena, Calif.), which was capable of achieving accuracy of a few centimeters. The present invention calculates positional data in substantially the same manner as the ISTAC Model 2002 but performs in real time and does so with reference frequency oscillators that are less accurate and stable than the rubidium oscillators of the earlier ISTAC Model 2002 systems. However, like the ISTAC Model 2002 systems, this invention can provide a differential GPS (DGPS) positioning system. The LSS device output is composed of the compressed raw observations of the multiple GPS satellites in view. Thus, when the host authentication server processes the remote client signature, it is doing a full DGPS solution by explicitly forming a satellite by satellite differential C/A and P(Y) pseudo-ranging observable that eliminates any SA dithering,
on-orbit clock instability and attenuates the errors in the satellite broadcast orbit elements. Using software intensive digital signal processing and modern simultaneous multi-parameter estimation methods, these analysis methods allow near land survey quality positioning.

III. Codeless DGPS Embodiment a. General Description of Signal Processing

Although not all security applications of the present invention will require the extra accuracy of DGPS technology, because of the possibilities of greater accuracy and security, the DGPS configuration of the invention shown in FIG. 2 is the preferred embodiment. Referring now to the embodiment of the invention shown in FIG. 2, further details of codeless signal processing in that environment will be explained.

In accordance with the present invention, applicants have devised a method and apparatus for developing a location signature of a remote client and testing the authenticity of that signature at a host site by processing the raw state vector observations provided as the location signature. A LSS device in the client authentication means at the remote client location and another at (or associated with) the host authentication server site intercept wideband spread spectrum signals transmitted from a plurality of satellites passing above the horizon. Without using knowledge of the code sequence of the satellites, each LSS device prepares the spread spectrum signals as digitized state vector observation data. Each LSS device proceeds by compressing the wideband GPS signals received from the satellites into a narrow band by a compression ratio of at least 100,000:1, preferably at least 280,000:1, removing any frequency bias with a reference oscillator having a frequency offset value that prevents the baseband from passing into a negative frequency space, forming a narrow analog baseband signal comprised of sine wave superpositions, and then producing an analog-to-digital converted representation of the sine wave superpositions.

The LSS device at the client authentication means buffers a few to several hundred seconds of these state vector observations within a storage buffer. The client LSS device then transfers the contents of the buffer upon challenge by the host. After receiving the client's state vector observations and obtaining any necessary state vector observations from the LSS device associated with the host, the host authentication processor then performs digital signal processing to produce spectral lines composed of amplitude, frequency and phase values. Then each spectral line is associated with an individual GPS satellite by (1) generating a model spectrum including a frequency offset value corresponding to the frequency offset value of the reference oscillator based on the approximate (or previously registered) location of the remote client and on position and velocity of the satellites (as derived from the individual satellite orbit elements); (2) comparing the spectral lines with the digital model spectrum values to determine the identity of each satellite corresponding to each spectral line; and (3) estimating the reference oscillator frequency offset value. The host authentication processor then determines the state vector for the client: a three dimensional baseline vector and a velocity (if any). This state vector can then be measured against pre-determined authentication criteria.

The client LSS device creates a continuously changing locational signature, which is different at every location on Earth and is reduced to a precise state vector by processing at the host. The client LSS device can be configured to produce the state vector observations comprising the signature in a wide variety of formats, for example, a 2000 byte signature every 10 seconds, resulting in approximately 2 million trillion potential combinations. This signature is transferred to the host within a few seconds, depending upon the client-to-host channel capacity. For example, at a communications rate of 14,400 bits per second, the signature is transferred in 1.7 seconds. Within two seconds, the host processes the signature to a state vector from which the authenticity of the location of the client-signature generator can be verified and host access granted or denied based on authentication criteria that comprise a predefined location with proximity criteria.

Before turning to a detailed description of the hardware used to implement the invention, it is useful to have an overview of the software logic. Separate descriptions of the software logic for controlling the client authentication means 240 and host authentication server 250 are presented.

b. Client Software Overview

Figure 3A:
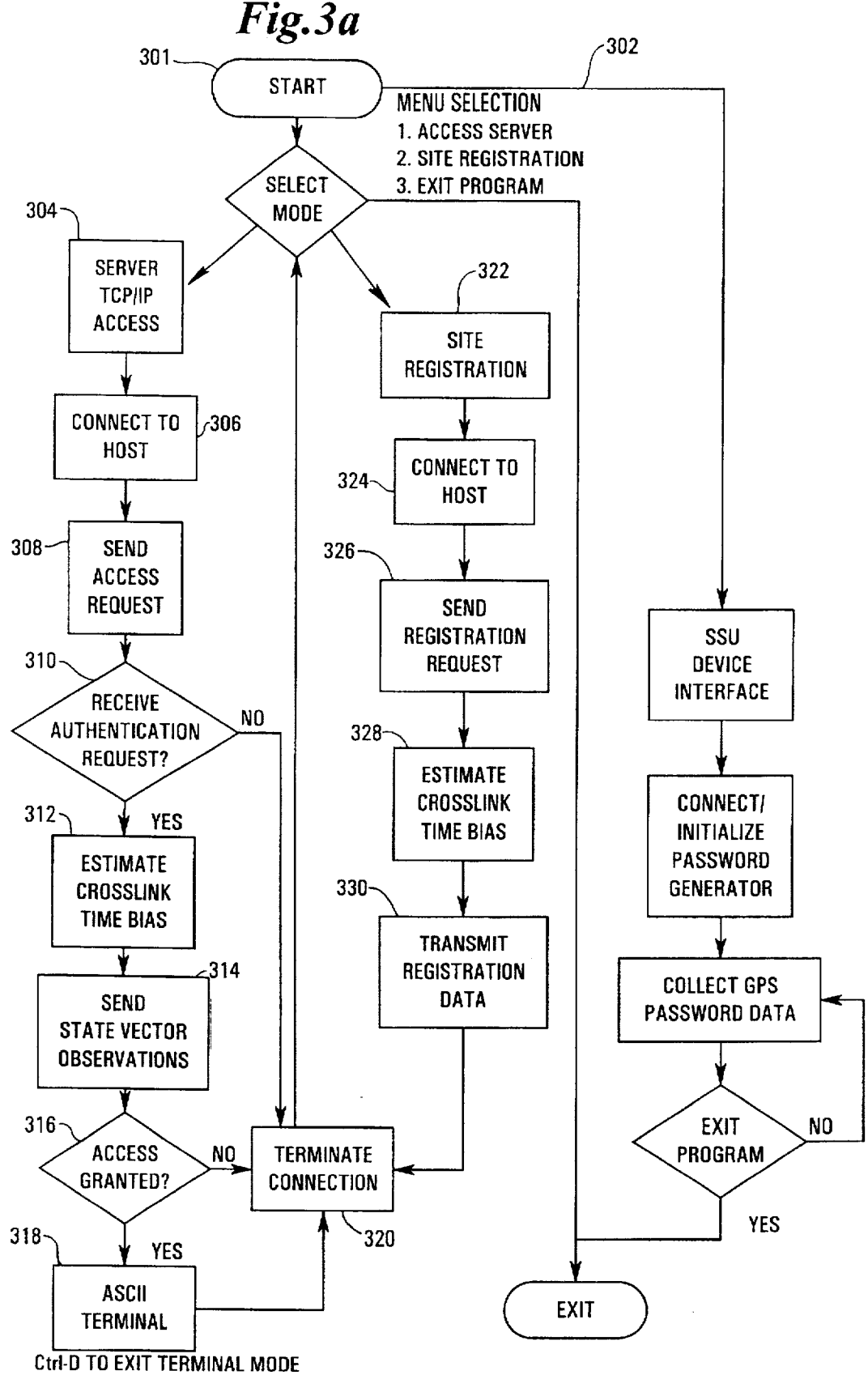
FIG. 3a is flowchart showing the overall logic structure of the control software in a LSS device.

Referring now to FIG. 3a, the client software is a Windows (trademark of Microsoft Corporation) based application, which allows the client authentication means 240 to make an Ethernet connection to the host authentication server 250 by using a TCP/IP protocol and attempt to gain access. Embedded within this application are the necessary objects to develop and communicate state vector observations.

FIG. 3a illustrates the control flow for the client software. When the software is started 301, the program splits into two primary execution paths, one for the user interface and the other for LSS data collection. The software continuously stores the location signature data (state vector observations) in a buffer, which can be defined in the program configuration file. The buffered data stream allows the remote client to send state vector observations to the host at a "faster than real time" rate in order to reduce the connect time. (That is, a segment of buffered data may represent X seconds of real-time observations, but the elapsed time for transmitting the "X-second" segment may be much less than X seconds.) The user interface portion of the software employs graphical user interface standards consistent with Windows (trademark of Microsoft Corporation) applications. The operator selects from three possible activities: 1) Access host; 2) Log-in Registration; and 3) Exit Program.

In the access host mode, the client software attempts to gain access to the host. It is assumed that the remote client has been previously registered with the host authentication server through a log-in registration procedure to be described later. The client initiates TCP/IP access at step 304 and connects to the host at step 306, then sends an access request code. The host will challenge the remote client with an authentication request at step 310, requiring it to respond with appropriate LSS data (state vector observations), at which point the client will begin to follow a set of transfer procedures controlled by the host. First, the host uses a token passing procedure with the client to estimate the crosslink time bias at step 312. Once this is complete, the host will challenge the client to respond with state vector observations derived from LSS device raw GPS data. The client sends digitized state vector observations at step 314. If the client site is verified to be where it is registered, the authentication process is completed within a few seconds, and access is granted at step 316 on an ASCII terminal basis at step 318. The time required to perform authentication will vary based on the consistency of the current state vector observations, compared to what was measured as part of the original log-in registration process. If access is denied or the client exits ASCII terminal mode, then the software terminates the connection at step 320.

For clients who are attempting to access the host from a non-registered location (i.e., seeking unauthorized access) the authentication process at step 316 will continue until a time-out is reached. The host continues to request state observations to get a fix on the unauthorized client location. The time-out interval can be set in the configuration file and might be a few minutes. Messages can be displayed during this process which will falsely allude that the host is still attempting to authenticate.

If the site registration mode at step 322 is selected, the client connects to the host at step 324 and then sends a registration request at step 326. The host uses a token passing procedure with the client to estimate the crosslink time bias at step 328. Once this is complete, the host (assuming the registration request is granted) will invite the client to transmit registration data at step 330. Upon completion of this, the client terminates the connection at step 320.

c. Host Authentication Server Software Overview

Figure 3B:
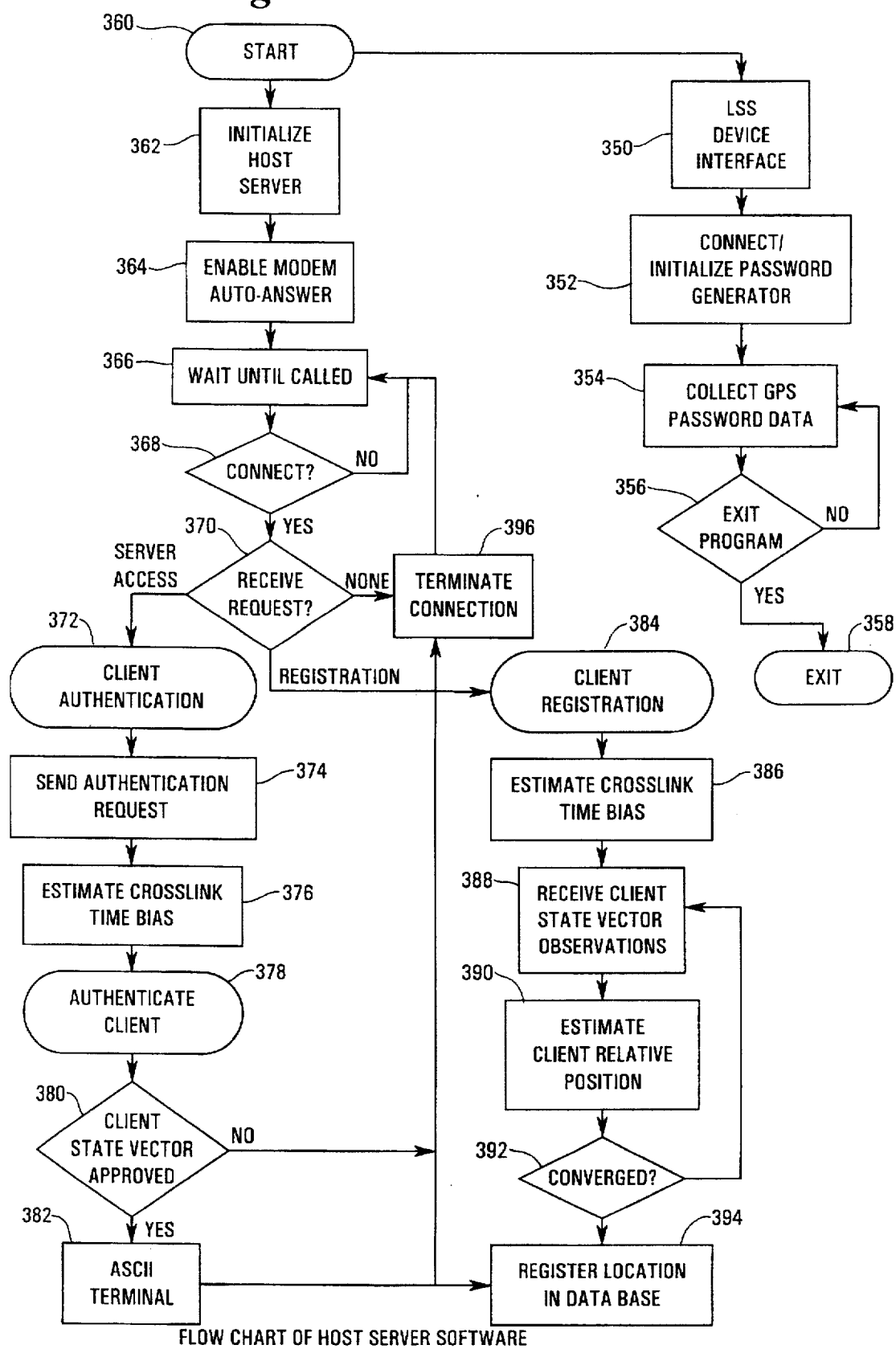
FIG. 3b is flowchart showing the overall logic structure of the control software for a host authentication server entity that receives and determines the authenticity of LSS information before granting host access.

FIG. 3b shows control flow of the host server authentication software, which initiates and performs the authentication process and provides an ASCII terminal interface service if the client is properly authenticated. In addition, the host server software also supports an automatic client log-in registration procedure, which can be accessed from the client software. The host server software is an answer only application, and will not respond to any action unless the correct initiating sequence is supplied by the client software.

Upon startup, the host server software splits into two application paths: the remote client/host server procedure at step 362 and the LSS device interface at step 350, which provides the interface to the location signature sensor associated with the host. The LSS device interface at step 350 can be configured to collect and store state vector observations (raw GPS data) from the LSS associated with the host in a file on disk for archiving and data processing. Throughout the execution of the program, state vector observations are continuously collected from the LSS device associated with the host authentication server site.

FIG. 3b illustrates the control flow of the host authentication server software. The remote client-to-host authentication server procedural path is the execution path that manages client access to the host. After startup at step 360, the host software initializes the host server at step 362 and enables the modem to which a client will connect for auto-answer at step 364. The software then goes into wait-until-called mode at step 366 with a decision loop to test at step 368 whether a connection from the client to the host authentication server has been made. If there is no connection, the wait-test loop continues. If a connection is made, the software tests the request code to see if it is proper and, if proper, what request has been made at step 370. If there is no proper request, the software terminates the connection at step 396.

If a valid request code for client authentication at step 372 is present, the host sends an authentication request at step 374. The host uses a token passing procedure with the client to estimate the crosslink time bias at step 376. Once this is complete, the host receives state vector observations and uses the authentication processor to develop the client state vector and apply the authentication criteria at step 378. The result of the authentication processor's execution is either the presence of an authentication signal or its absence, indicating no authentication, at step 380. If an authentication signal issues, the host provides ASCII terminal access at step 382 to the client. If no authentication signal issues, the client state vector was not accepted under the authentication criteria, and the host authentication server software terminates the connection to the client at step 396.

If a valid request code for client registration at step 384 is present, the host uses a token passing procedure with the client to estimate the crosslink bias at step 386. Once this is complete, the host receives the client's state vector observations and from that calculates to determine the relative geodetic position of the client at step 390. This is an iterative calculation, so the software determines whether the result of the positional determination has converged at step 392. If it has not, the software receives additional state vector observations and again calculates to determine the relative geodetic position of the client. If the positional determination has converged, then the host software registers the location in the database for authentication criteria at step 394 and terminates the connection to the client at step 396.

The invention can be manifested in both hardware and software products to support a wide range of network platforms to include multiple desktop and host environment systems and peripheral devices for communications, internetworking, and security.

The standard host software is for use in performing initial authentication of clients requesting host access at the time connection to the host is first requested. In many systems authentication only at this time will be sufficient. However, for systems seeking a higher level of security, the standard software can be supplemented with optional upgrades for continuing, periodic authentication and two-way authentication. With the latter, the same authentication that the host requires of the client is reversed, to that the client also requires that the host provide a location signature for authentication.

d. LSS Hardware

The host authentication server could be a stand-alone gateway functioning as a transparent front-end security processor for a host entity, and as a hardware module with host authentication server software for secure network environments. The LSS may exist in several different form factors. The LSS can be a stand-alone device similar in size to a desktop modem unit. The LSS may also exist in a PC card form factor, a PCMCIA card format for laptop computer use in remote client or mobile host server applications or can be configured into a single microchip for integration into original equipment manufactured products.

The form factor of the LSS consists of an antenna/sensor unit to be placed outdoors or at in indoor location with adequate GPS satellite "view", and a small driver/communications unit that is interfaced to the host server computer through either a specialized internal board or a serial RS 232 data communications port. The introduction of the LSS device into an overall system may be within the gateway network or firewall function or some other portion of the network architecture that will be defined by an individual product application. In all situations, the primary function of the LSS is to produce digitized state vector observations for downstream processing.

In the preferred, codeless design of the LSS hardware, it is desirable to employ as simple a device as possible, composed of a hybrid combination of analog and digital circuitry in the manner described in U.S. Pat. No. 4,797,677, with a moderate quality reference oscillator contained within the LSS device. The reference oscillator is on the order of 0.1 parts per million (PPM) frequency accuracy. This implies that for compressing GPS signals from the P(Y) channel centered at 10.23 MHz with a reference frequency of 10.22995 MHz, the actual frequency being generated is uncertain by approximately 1 Hz for a 0.1 PPM reference source accuracy. The baseband signal bandwidth that contains the state vector observations to be eventually processed into position and velocity information is essentially contained within ±27 Hz for a static, Earth-based site exploiting the P(Y) channel, with its pseudo-random noise (PRN) chipping frequency of 10.23 MHz, and ±2.7 Hz for the C/A channel, with its chipping frequency of 1.023 MHz.

Figure 4:
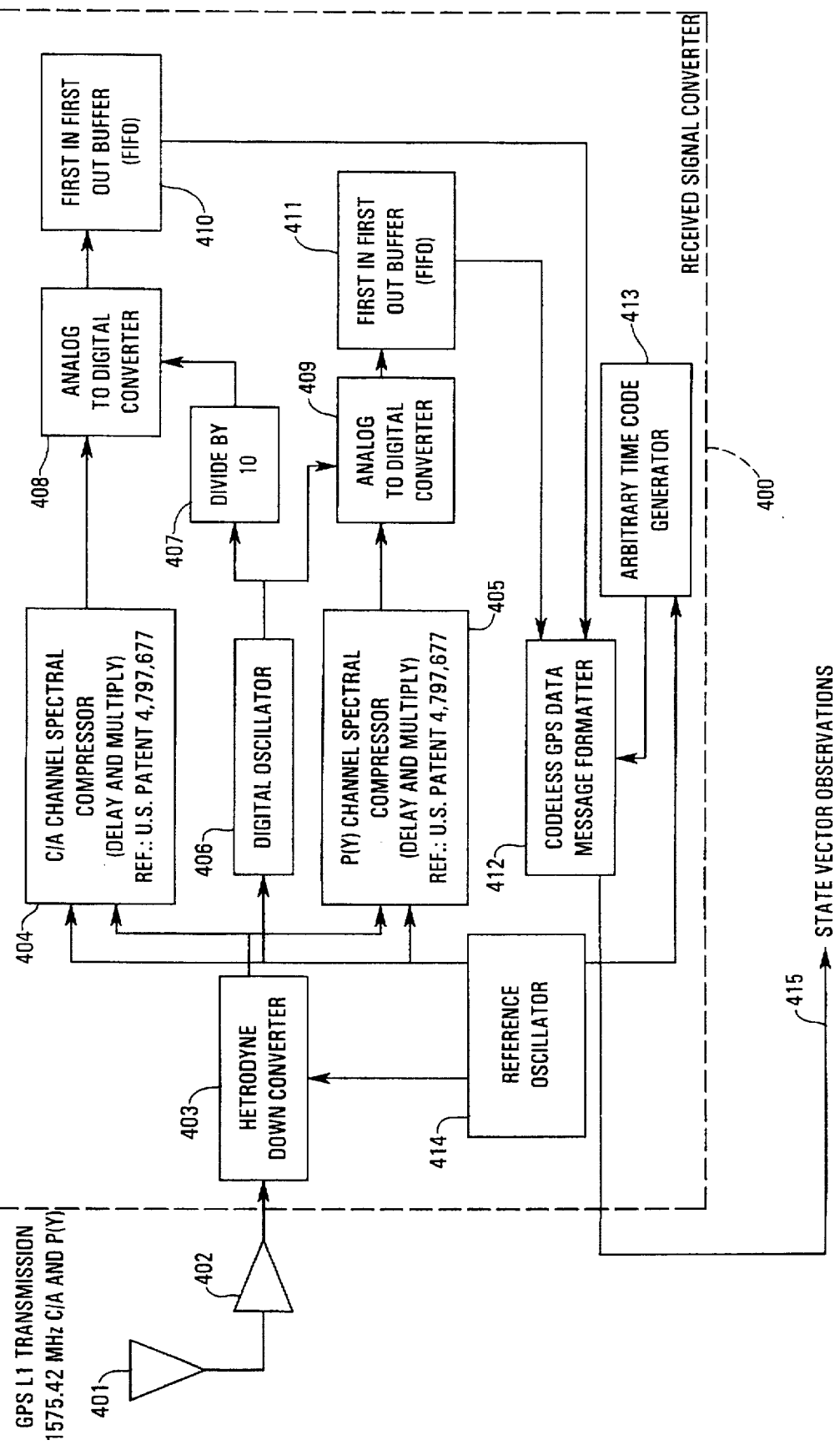
FIG. 4 is a schematic block diagram of the hardware in an LSS operating on codeless processing principles that prepares LSS information in the form of state vector observations for communication to a host authentication server.

FIG. 4 shows in schematic block diagram form the hardware for an LSS device 400 using the preferred codeless technology. The antenna 401 is configured for approximately 20 MHz bandwidth reception at L1 (1575.42 MHz) and/or L2 (1227.6 MHz) right hand circular polarization (RHCP) and is assumed to have no appreciable gain (0 dB). The signal from antenna 401 goes to a low noise amplifier (LNA) 402 with a gain of 20 dB and a noise figure of 1.5 dB, which is equivalent to 122 Kelvins noise temperature. The output of LNA 402 goes to a heterodyne down converter 403 using an active, double-balanced mixer and having a conversion gain of 18 dB. It is driven by a local oscillator operating at 1556.42 MHz, which may be free-running or synthesized from the reference oscillator 414. The stability requirement for this local oscillator derives from the requirement that a majority of the spread spectrum signal power from the GPS satellites arrives within the first intermediate amplifier bandpass of the sensor.

The width of the P(Y) channel spread spectrum signal is 20.46 MHz between the first nulls and is 2.046 MHz for the C/A channel. Following the heterodyne conversion stage 403, the signal goes to the first intermediate frequency (IF) amplifiers of spectral compressors 404 and 405 at a center frequency of 19.0 MHz. Compressor 405 performs spectral compression of the P(Y) channel signal. The bandwidth of the first IF is approximately 20 MHz so as to pass the majority of the central lobe of the P(Y) spread spectrum. Compressor 404 performs spectral compression of the C/A channel signal. For the C/A channel, the width of the first IF is 2.0 MHz, so as to pass the full width of the spectra between the first nulls. The details of the effective spectral compression achieved by the delay and multiply operation are given in U.S. Pat. No. 4,797,677 (which is incorporated herein by reference).

The choice of the center frequency of the first intermediate frequency is not completely arbitrary; rather it is constrained by the delay and multiply architecture employed to recover the 10.23 MHz chipping frequency used to create the spread spectrum of the GPS satellite signal. To maximize the chipping frequency signal recovery, it is necessary to split each channel into two signals and delay one signal path by an amount of time equal to one-half of the P(Y) or C/A channel chip period or 49 nanoseconds or 490 nanoseconds, respectively. Within compressors 404 and 405 are filters composed of passive elements (inductors and capacitors) to perform this delay function. The frequency corresponding to a period of 49 nanoseconds is 20.42 MHz. However, because a down conversion frequency of 10.22995 MHz will be subsequently used in the sensor, there is the possibility of second harmonic power being present which will have a desensitizing effect upon the second IF stage. Thus, the time delayed path through the filter is phase-shifted by one full wavelength at the first IF amplifier frequency of 19 MHz and 10 full wavelengths for the 490 ns delay. The resulting delays of 49 ns for P(Y) and 490 ns for C/A are sufficiently close to optimum to be quite practical.

A mixer in each of the spectral compressors 404, 405 multiplies the in-phase and delayed path signals, which has the effect of compressing the spectrum into a width of 70 Hz with a center frequency of 10.23 MHz. The stability of the satellite-transmitted 10.23 MHz signal that controls the PRN sequence generators within the GPS satellites is governed by the atomic oscillators within the satellites and is not a function of the first local oscillator frequency within the LSS 400. One and only one spectral line is created by each satellite because of the maximal length code structure of the PRN. The coded signals have a very low cross-correlation product between the satellites, and thus the intermodulation products are low to non-existent. See, "GPS Signal Structure and Performance Characteristics", J. J. Spilker, Navigation, Institute of Navigation, ISBN 0-0936406-00-3, Vol. No. 2, Summer, 1978.

The signals output by spectral compressors 404, 405 result from a final down conversion to a baseband using a reference oscillator 414 having an accuracy of 0.1 PPM or better. The actual frequency of operation of this second local oscillator 414 will be a solved-for parameter in the final state vector estimation procedure, which will be performed by the host authentication processor 214.

It is now possible to establish the rationale for determining the nominal value for the down conversion frequency to be used in the LSS device 400; namely, a reference oscillator whose accuracy is 0.1 PPM at a nominal 10 MHz causes 1 Hz offset. The nominal Doppler frequency shifts along the lines of sight from the LSS device 400 to the multiple GPS satellites above the horizon are ±27 Hz. A possible LSS velocity-induced Doppler shift (<220 m/sec., 440 knots) results in a 6.8 Hz shift. Thus, the dominant effects on the chipping frequency spectral line position are the combined Doppler effects from the GPS satellites and a possible velocity of the remote client. The least influential effect is from the reference oscillator frequency accuracy. The sum of the worst case combination of these tolerances is 34.8 Hz. For convenience in processing, it is useful to have the spectral lines remain on the same side of the zero frequency. Assuming that the center frequency of the compressed baseband is placed at 50 Hz, the negative tolerance of 34.8 Hz makes it necessary to process a band extending from 15.2 Hz to 84.8 Hz.

e. LSS Hardware Operations Details

The primary function of the reference oscillator 414 is to remove the frequency bias that contains no positioning information, leaving only the small bandwidth signals of 70 Hz for the P(Y) channel and 7 Hz for the C/A channel, which are then digitally sampled at 200 Hz for the P(Y) channel and 20 Hz for the C/A channel. The output level of spectral compressors 404 and 405 is +13 dBm (1 V rms at 50 Ohms) and is used as the input to a pair of analog to digital converters 408 and 409, which are triggered by digital sampling signals from oscillator 406 and divider 407, respectively. Each analog-to-digital converter 408, 409 performs an eight-bit sampling of its respective input waveform at a rate of 200 Hz or 20 Hz. The actual number of bits in the analog-to-digital conversion can be a variable that might be commanded by the host server but will always be at least one bit. For the P(Y) channel, the choice of 200 Hz is governed by the need to adequately sample the 15.2 Hz to 84.8 Hz physics band from the LSS. The 200 Hz sampling rate is 18% above the minimal rate of 170 Hz of the Nyquist sampling criterion.

The outputs of the analog to digital converters 408, 409 are transferred to digital memory buffers 410, 411, which function as first-in, first-out (FIFO) data buffers for C/A and P(Y) data, respectively. The FIFO buffers 410, 411 can be configured to contain from 10 seconds (about 200 samples) to several minutes of state vector observations, as may be required or commandable from the host authentication server 250. (The larger buffer capacities can be implemented (i.e., 20 kilobytes for 100 seconds) for other applications, such as initial remote client location registration or possibly to derive the location of a party attempting a fraudulent transaction with a stolen LSS device.) These FIFO buffered, analog-to-digital converted values are (in the case of the client LSS) then transferred upon challenge by the host server for subsequent processing into the state vector of the remote client.

The contents of the buffers 410, 411 are formatted for transmission by a message formatter 412, clocked by an arbitrary time code generator 413. The resulting formatted state vector observations 415 are transferred for the initial site log-in registration process and for the LSS response from a remote client that seeks host access and provides the state vector observations for testing against the host's predetermined authentication criteria. As discussed in greater detail below, the state vector observations are typically tested for consistency with authentication criteria based on the registered location of the remote client.

Although the preceding discussion has been focused primarily on the LSS 203 in the client authentication means 240, in the preferred embodiment, LSS 203 will be essentially identical to the LSS 218 that prepares state vector observations under control of the host authentication server 250. However, in some applications where the LSS 218 is immediately adjacent the host authentication server 250, some of the compression and formatting of the state vector observations required for effective communication on standard lines from a remote site would not be necessary.

f. Host Authentication Server Hardware

In FIG. 2, the client authentication means 240 is shown transferring its compressed band GPS signals, the state vector observations, to the host authentication server 250. The data processing functions operating on GPS signals sent to the host authentication server 250 are performed by a specially configured 80486/100 MHz or Pentium class personal computer architecture or, alternatively, a workstation class computer.

Figure 5:
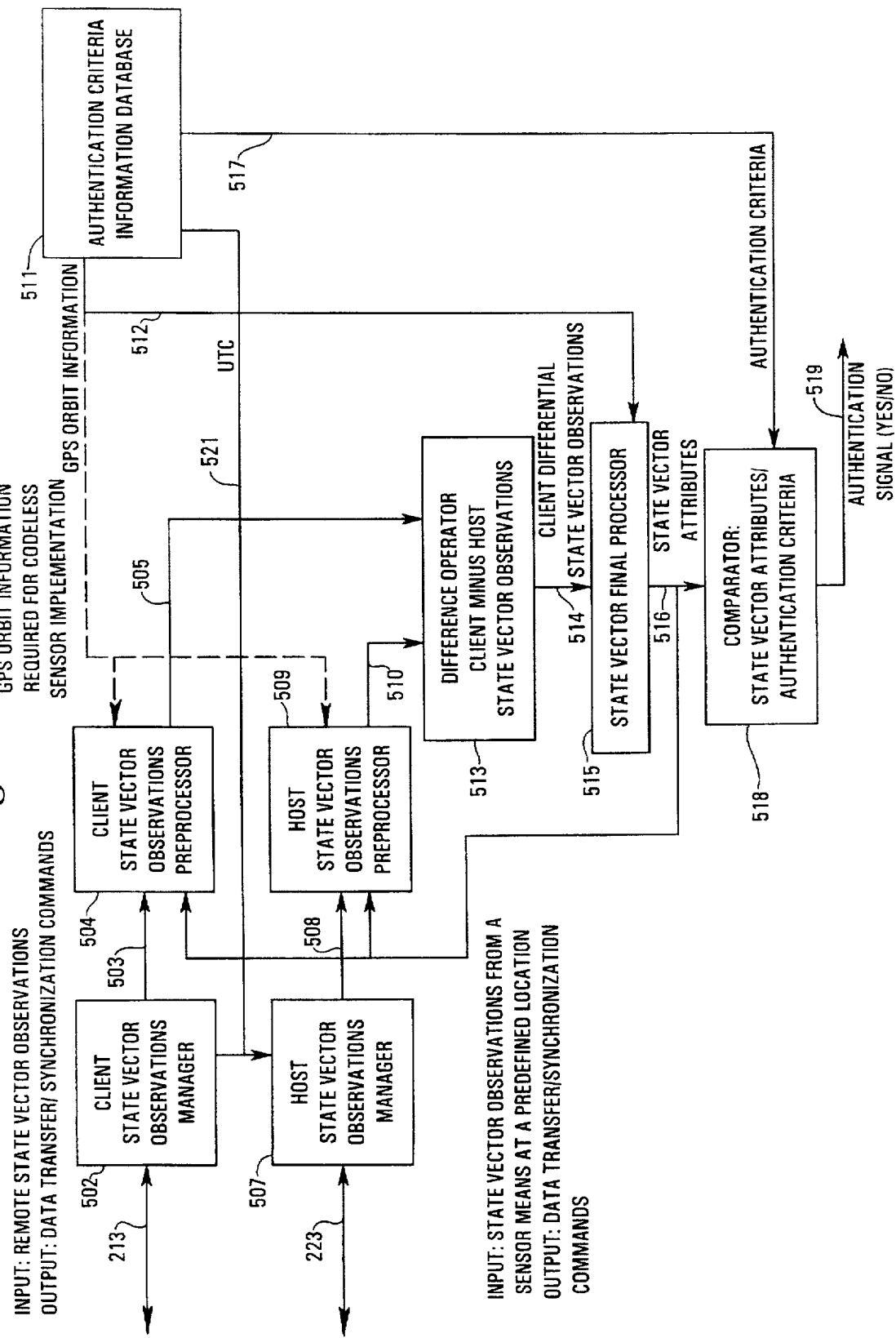
FIG. 5 is a block diagram of the host authentication server components involved in determining authenticity of state vector observations communicated from a remote entity and also from an LSS under the control of the host authentication server.

Referring now also to FIG. 5, the data processing at the host authentication processor 214 as aided by the client access control 212 is explained. At the host authentication server site, the processing sequence of events begins with challenging the client authentication means 240 at the remote client to respond with the digital raw GPS data. A part of the host authentication server 250 is a LSS device 218 which transfers state vector observations acquired for the host site (usually locally acquired and of similar duration to the client-supplied observations) to enable the DGPS processing.

Before turning to the processing of the state vector observations from the client LSS device 203 and host LSS device 218, comment on the contents of the authentication criteria information database is useful. An important feature of the codeless form of this invention is the ability to identify each of the individual satellite signals arriving at the location of the LSS's without PRN code use or telemetry interception at the client location. However, at the host, where more extensive GPS information, e.g., satellite orbits, is required for efficient processing, a conventional GPS receiver (not shown) is used to capture and provide such information for the authentication criteria information database 511. One suitable form of receiver is the MicroTracker, manufactured and sold by Rockwell/Collins, Cedar Rapids, Iowa with an antenna shared by the conventional C/A receiver and the host's LSS device. This C/A receiver provides three components of geodetic information to the database 511 for use by the host authentication processor 214:

(1) the approximate (within 100 meter) location consisting of latitude, longitude and height components of the state vector of the host authentication server processor, which need not be accurately set within the World Geodetic Datum. (In fact, there is some explicit value to intentionally offsetting the host authentication server geodetic location by several tens of meters, to add an additional level of security. The differential baseline vector solution for the individual authorized remote client locations would then contain that host server bias. This would not be general knowledge and make it more difficult to spoof a host by first having known the true geodetic coordinates of the remote client location)];

(2) the GPS satellite orbital elements in the form of the almanac and the precision elements provided by the C/A receiver; and (3) an approximate epoch time based on Universal Time Coordinated, which is needed to an accuracy of only 0.01 second to meet the requirements of 1 meter differential positioning accuracy for a 200 km separation between the LSS and the host server site.

As will be seen, this information is accessed by various components and used at various stages of the processing shown in FIG. 5.

The normal operating scenario and functional components for host authentication processing are as follows. The client authentication means 240 at the remote client transfers 10 seconds of P(Y) channel data and/or 100 seconds of C/A channel data captured by LSS 203, comprised of 2000 bytes plus communications overhead. That is, the contents of the buffers 410 and 411 are transferred via channels 209, 211 and 213 to the client state vector observation manager 502, which stores the transferred data in a buffer and organizes the data to ensure that it is in the right sequence and that there are no gaps in the sequence. The manager 502 also receives as an input UTC epoch time 521 from database 511 and provides the association between the arbitrary time base in the sequence of buffered data and UTC. Thus, manager 502 acts on the 2000 sample points, representing a 10 second time series, preparing an output stream 503 for client state vector observations preprocessor 504.

Processing in the client state vector observations preprocessor 504 begins with Fast Fourier Transform (FFT) processing. The result of FFT processing is a discrete frequency spectrum (set of spectral lines) composed of amplitude, frequency and phase values for the entire 86 Hz bandwidth of the received channel sensed at the remote client's LSS 203. The FFT functions of preprocessor 504 may be implemented in either software or firmware and derive their phase information from an arc tangent operation on the in-phase divided by quadrature amplitude ratios.

The processing continues by identifying each of the satellites that are present, as represented by a spectral line having been extracted from the FFT digital signal processing. An analytical model of the situation is formed in state vector observations preprocessor 504 by using the known physical circumstances. The required inputs to this model are the locations of the host authentication server site, remote client registered location, the GPS satellite orbital elements (to predict which of the perhaps twenty-four possible GPS satellites are likely to be in common view of the remote client and host authentication server) and the UTC data from database 511 supplied with the input stream 503.

After the spectral lines are isolated, the preprocessor 505 associates each spectral line with an individual satellite and converts the amplitude, frequency and phase values into equivalent range and range rate values in an output stream 505.

The same buffering, organizing and checking functions that are performed on the client LSS data are performed on the host LSS data. That is, buffering, organizing and checking functions are performed at the host state vector observation manager 507 on the host authentication server's LSS data records (arriving via channels 219, 221 and 223) from a host-controlled, predefined location. The output stream 508 of host observation manager 507 consists of host LSS data associated with UTC of the same type as the output 503 from client observations manager 502.

The output stream 508 goes to the host state vector observations preprocessor 509, which performs Fast Fourier Transform (FFT) processing. As with the processing in preprocessor 504, the result of FFT processing here is a discrete frequency spectrum (set of spectral lines) composed of amplitude, frequency and phase values for the entire 86 Hz bandwidth of the received channel sensed at the host's LSS 218. After the spectral lines are isolated, the preprocessor 509 associates each spectral line with an individual satellite and converts the amplitude, frequency and phase values into equivalent range and range rate values in an output stream 510.

State vector observations from both sources are required to perform a differencing of the frequency and phase observables, so as to explicitly eliminate the selective availability (SA) dithering which is imposed on the GPS signals. Thus, both of the output streams 505 and 510 from the client and host state vector observations preprocessors 504 and 509, respectively, are communicated to the difference operator 513. The difference operator 513 subtracts the host state vector observations from the client state vector observations to produce differential state vector observations for each of the common view satellites. The output 514 of difference operator 513 is the set of client differential state vector observations. The set of client differential state vector observations becomes the input to state vector final processor 515, together with GPS orbit information 512 from the database 511. This processor 515 develops the baseline vector, which is the x, y, z offset of the remote LSS 203 from the host LSS 218. This operation is a simultaneous estimation processor filter, such as, a Householder Transformation, that evaluates the three dimensional vector components, time bias, differential receiver phase bias and the frequency offset term of the reference oscillators 414 of the LSS's.

More specifically, the state vector final processor 515 computes the expected satellite Doppler shift, derived from a nominal position for the LSS and any approximate velocity for the remote client. The Doppler shift for each satellite is decomposed into southern, eastern and vertical components in the topocentric reference frame. These three components comprise three of the unknowns for the system of equations. The fourth unknown is the client LSS reference oscillator 414 frequency offset which will be estimated relative to the host server reference oscillator. Each observed satellite signal source presents one equation containing these unknowns. Hence, a minimum of three observations is required for two-dimensional measurements and four observations for three dimensions.

A computation of the Geometric Dilution of Precision (GDOP) for the satellite constellation geometry existing at every epoch is performed in processor 515. A Householder rotation and back substitution are then used to triangularize the observation matrix and solve the equations. This is equivalent mathematically to a Kalman filter update; however, it has been shown to be more numerically stable. ("See, Factorization Methods for Discrete Sequential Estimation", G. J. Bierman, Vol. 128, Academic Press, 1977.) The solution vector is in units of meters of either the P(Y) or C/A phase or meters per second equivalent for the frequency offset term. The components of this solution vector corresponding to positioning and velocity are obtained by multiplying the received P(Y) channel chipping wavelength (29.3052256 m) or the C/A channel chipping wavelength (293.052256 m) to achieve the estimated values for the positioning and velocity measurement.

When the baseline vector is added to the host position vector in processor 515, the result is a set of state vector attributes of the client, which is provided as output 516 to the final comparator operation in the state vector attribute comparator module 518. If the comparator 518 determines that the authentication criteria are satisfied, it produces an affirmative authentication signal on line 519. Otherwise, the authentication signal on line 519 indicates that the authentication criteria were not satisfied, and the client is not granted access to the host. (It should be noted that the output 516 is also provided to the client and host state vector observations preprocessors 504, 509 as an input to [iterative] calculations that occur there.)

While not every security situation addressable by this invention will require sub-meter or millimeter precision in resolution of the state vector from state vector observations provided to the host, as discussed next, very high precision is available.

As an example, within the ten-second time series input to the individual FFT operations, the resultant frequency bin resolution is 0.1 Hz. The FFT operations are performed on five-second segments. Using the signal power in the bins adjacent to the strongest peak, it is possible to interpolate to better than an individual 0.1 Hz bin width and determine the most probable frequency value to an accuracy of 0.02 Hz. Because the FFT operates on five-second segments, and given a frequency uncertainty for an individual spectral line of 0.02 Hz, the phase will be uncertain by 5 seconds×0.02 cycles/second=0.10 cycle. This phase is well within the 0.16 cycle criterion needed in order to perform phase connection between adjacent and overlapping time series intervals. Given 12 FFT-derived estimates of amplitude, frequency and phase every minute, a least squares quadratic (or higher order, if necessary) fit to the phase data can be performed at a predetermined rate that will account for possible frequency drift of the reference oscillator in the relevant LSS. Given an FFT signal-to-noise ratio of 20, the equivalent phase noise will be 0.05 radians (0.008 cycle). The aggregate precision of the frequency measurement over a one minute interval will be 0.008 cycle/60 seconds or $1.2 \times 10^{-4}$ Hz which is equivalent to 25 meters, given a positioning sensitivity of 5 microHertz per meter for the P(Y) channel. Given a horizontal dilution of precision (HDOP) of 2 and four or more satellites, each with a Doppler measurement precision equivalent to 25 meters, the positioning solution is equivalent to 50 meters.

In accordance with the description of the codeless positioning methods in U.S. Pat. No. 4,797,677, tracking of the connected P(Y) channel phase data provides the approximate baseline vector with sufficient precision to resolve the C/A cycle ambiguities, which are 293 meters. The C/A cycle phase precision of 5 meters is then used to resolve the 29.3 meter ambiguities of the P(Y) channel in order to achieve sub-meter positioning precision. In a similar manner, the P(Y) channel phase tracking can be exploited to a precision of a few centimeters, which can be used to resolve the 86 cm ambiguities of the L1–L2 data type, which, in turn, can be utilized to achieve millimeter precisions in differential positioning.

As noted above, conventional C/A code-correlating GPS receiver at the host server site extracts the GPS data broadcast by each of the in-view satellites and provides certain information to the database 511. Specifically of interest are the GPS satellite orbital elements, the Universal Time Coordinated (UTC) and the geodetic location at which the LSS's associated with the host authentication server and client authentication means are operating. The required accuracies of each of these quantities will now be examined.

The accuracy to which the UTC epoch time is to be known is rather modest. For example, if it is desired to register the position of a remote client to an accuracy of one meter, then it is required to know the time at which to evaluate the satellite orbit elements in order to correctly estimate the individual satellite positions and correctly compute the vector separation. Consider that a 1 meter quality differential positioning is required over a separation of 2000 km. The differential attenuation of the orbit error over this baseline would be only 10 to 1. The angular equivalence of 1 m/2,000,000 m is 0.5 micro-radians, which for the GPS satellites at 26,000 km geocentric radius corresponds to 13 meters. Because the satellite's along-track velocity is 3800 m/s, a UTC error limit of 3 milliseconds is required to allow meter quality differential positioning at continental size scales. The conventional GPS C/A receiver that is available at the host server site is capable of supplying 0.1 microsecond timing traceable to UTC, and thus 3 ms accuracy is no problem.

The next timing element that enters is the accuracy with which the latency of the remote client data must be determined by the host authentication server. The maximum range rate on the lines of sight to the satellites is approximately 700 m/s so that in order to determine a differential positioning accuracy to 1 meter, the differential timing between the remote client and host server must be determined with an accuracy of approximately 1 ms. The LSS design[?] of the digital response to being challenged by the host server is to return a time-interval-constrained raw data set whose discrete samples of the baseband signals are separated by 5 ms for the P(Y) channel and 50 ms for the C/A channel. These LSS response packets are also accompanied by an arbitrary time code, which is maintained in the remote client LSS. As a part of the host server data processing, the actual UTC time tag that applies to the remote client LSS will be estimated.

The accuracy to which the satellite orbits must be known can also be assessed by the influence that such an error will have on the maximum rate of change of the Doppler shift. The period of the GPS circular orbits is nearly 12 hours and the geodetic radius of the orbit is 26,500 km. Therefore, the along-track velocity of the GPS satellites is 3.86 km/s. Currently, GPS broadcast orbits are accurate to 10 m to 20 m. The orbit error budget to allow 1 meter accuracy over a 2,000 km separation is determined by the ratio of the satellite height (20,000 km) to the site separation (2,000 km) times the positioning accuracy (1 m) which is then 10 meters on-orbit. However, under conditions that are consistent with U.S. Department of Defense SA policy that supports positioning of accuracy of 100 meters 2-d RMS, the orbit accuracy is approximately 120 meters. (See, Federal Radio-Navigation Plan, DOD-4650.4, DOT-TSC-RSPS-84-8, Department of Transportation, 1989.) If the broadcast orbit accuracy were to be degraded to 120 meters, then the system accuracy would become 12 meters at 2,000 km separations.

The accuracy of the host server geodetic position can be easily met by accepting a C/A derived position whose accuracy will be 100 meters or better. An ordinary map can supply the necessary accuracy to support remote client/host server operations. A U.S. Geological Survey quadrilateral chart of 1:20,000 scale can provide locations to 20 m given identification of the host server site with a 1 mm map location accuracy.

On occasion, two or more satellites will have Doppler frequency shifts that are within 0.1 Hz of one another. This Doppler collision is dealt with in observations preprocessors 504, 509, either by temporarily deleting the two satellites in conflict or using a more sophisticated signal-detection algorithm that has greater frequency resolution. Such a greater resolution method can be achieved by phase-tracking the signals over an interval longer than the ten seconds of the FFT method, which achieves frequency bin widths narrower than 0.1 Hz. By phase-tracking individual satellites every five seconds over a 100-second interval with phase noise of 0.02 cycle, it is possible to attain an equivalent bin width of 0.2 mHz, which basically eliminates the Doppler collision problem. The fact that two satellites have nearly the same Doppler shift (within 0.1 Hz) is also information that is useful in the simultaneous estimation filtering approach.

IV. Single Client LSS Embodiment

Figure 6:
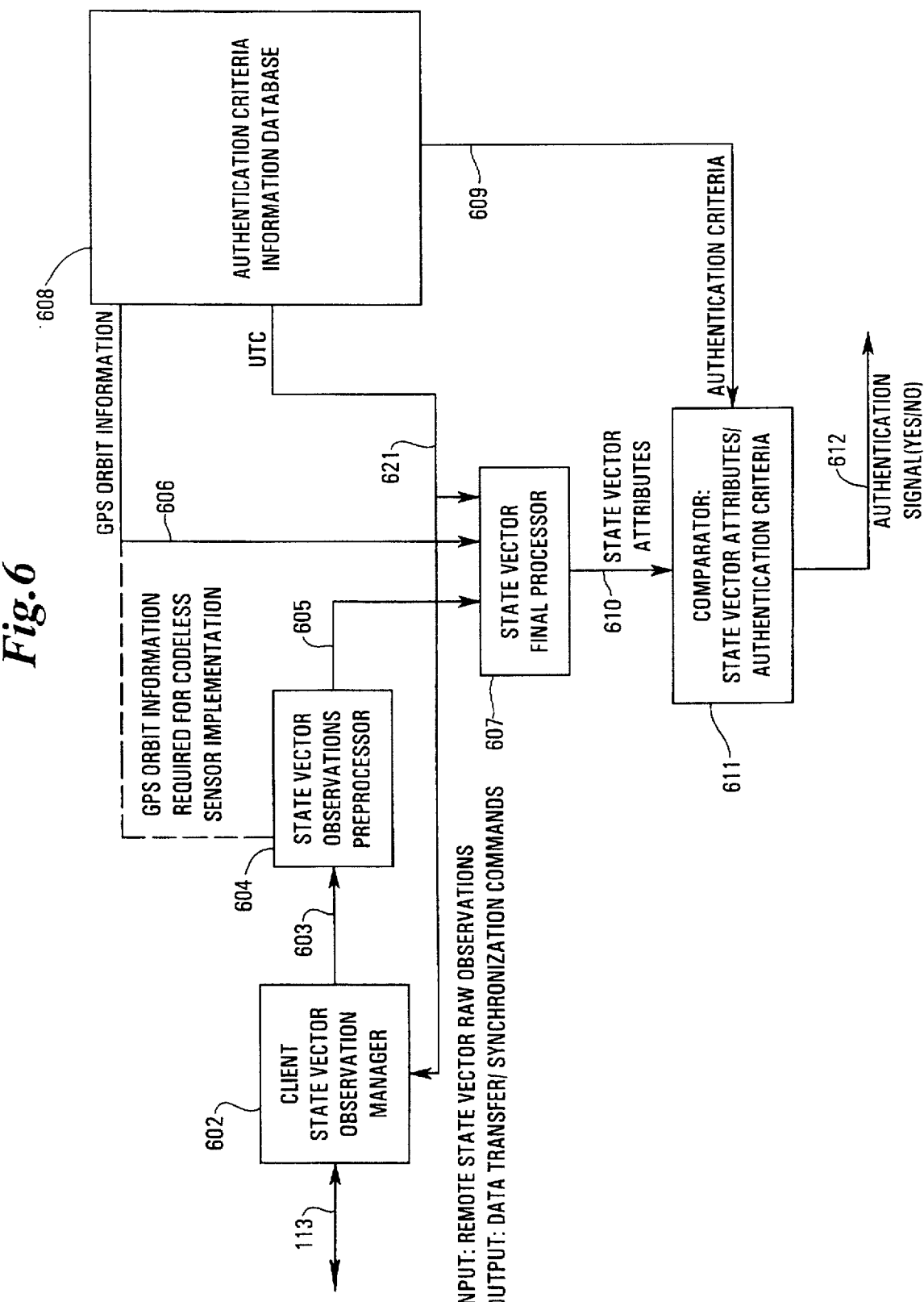
FIG. 6 is a block diagram of the host authentication server components involved in determining authenticity of state vector observations communicated only from a remote entity.

As noted above, FIG. 1 shows an embodiment of the invention in which the only state vector observations that are used in the authentication process are provided by LSS 103 at the client authentication means 150. FIG. 6 shows how the host authentication server 150 proceeds in that situation. There are a great many similarities between the components and authentication process in this situation and that shown in FIG. 5. Accordingly, only the broad differences are emphasized here. The reader is referred to the above discussion of FIG. 5 for further details.

As seen in FIG. 6, state vector observations from the client authentication means 150 are transmitted to the host authentication processor 114 via channels 109, 111 and 113. The state vector observations from the client authentication means 150 are first processed at the client state vector observation manager 602 and the output 603 of the manager 602 is passed to state vector observations preprocessor 604. This preprocessor 604 receives certain GPS orbit information 606, UTC data 621 and other parameters received by a conventional GPS receiver (not shown) controlled by the host authentication server 150 and stored in the authentication criteria database 608. The output 605 of the preprocessor 604 goes to the state vector final processor 607, which also receives certain GPS orbit information, UTC data and other parameters stored in the authentication criteria database 608. The output 610 of the state vector final processor 607 is a set of state vector attributes that is used as input to the state vector attributes comparator 611. The state vector attributes comparator 611 also receives as input on line 609 the authentication criteria stored in the authentication criteria database 608. If the comparator 611 determines that the authentication criteria are satisfied, it produces an affirmative authentication signal on line 612. Otherwise, the authentication signal on line 612 indicates that the authentication criteria were not satisfied, and the client is not granted access to the host.

The processing in this embodiment that yields the state vector attributes differs from the DGPS processing in the embodiment shown in FIG. 5 by the fact that an LSS is not available at the host authentication processor to act as the fixed correction site to eliminate the SA dither and atmospheric errors.

V. Authentication Criteria a. General Considerations

The application of the authentication criteria stored in database 511 (database 608 in the single LSS embodiment) is the final step of the authentication procedure and is implemented in state vector attributes comparator 518 (comparator 611 in the single LSS embodiment). Basically, the state vector attributes that have been defined as relevant have been extracted from the state vector observations supplied to the host authentication server 250 (or 150) and these are compared to predetermined authentication criteria. Usually, the state vector attributes distilled from the state vector observations supplied to the host authentication server define the location of the client, and that location is compared to the particular predefined location information for that client stored in the database 511 (608 in the single LSS embodiment) or to a list of authorized client locations stored there. If the host authentication server produces a remote client location that matches the previously registered client location within a predetermined threshold (e.g., three meters) access is granted to the remote client user. The range of location values considered acceptable is a variable that can be set, depending upon the separation between the remote client and the host authentication server and the quality of orbits available for real time processing. That proximity range for acceptance can be from millimeters to several meters, depending on the security needs and on other factors that might affect the ability of the system to make an exact (or near exact) geodetic location match.

The host authentication server manager can, if desired, follow the progress of any authentication procedure. For example, the estimated reference oscillator offset and data latency during the processing is archived to the computer mass storage and can be simultaneously displayed for the host authentication server manager on a monitor. The monitor output can also show the azimuth, elevation and satellite vehicle number of all potentially visible satellites. Satellites which have been actually received in common can be indicated, and observed signal-to-noise ratio recorded, including a polar plot indicating the relative position of the satellites to the LSS's, dilution of precision measurement of the current observed geometry, status messages regarding Doppler collisions (satellite Doppler values too close together to uniquely identify each satellite, i.e., 0.8 Hz difference, which are managed within the state vector observations preprocessors), differential oscillator offset variations, and the east, north and vertical position and velocity components averages spanning a set time interval (10 to 1000 seconds), depending in the level of assurance desired in the authentication. The operator can thus watch the position and velocity information derived from the DGPS processing as it is compared with the registered remote client location information (or, in some situations, the transferred C/A receiver position and velocity data) to verify that the remote client is either at the fixed geodetic site authorized (or, as discussed below, is willing to reveal its location if in a mobile environment).

Security afforded by the present invention is due to a combination of factors. One is simply the level of precision available. If the level of precision required by the authentication criteria is high, then the fraudulent client will not be able to get access by seeking access from a site that is close to the authorized site but not sufficiently close. The use of information from both the P(Y), C/A channels also has advantages.

The use of the codeless mode allows the compression of the P(Y) and C/A channels by a factor of a million to one of all in-view satellites, perhaps as many as twelve and is performed without knowledge of the actual code details. The compressed signals are then digitally sampled and formed into signatures to be transferred when appropriately challenged. The universe of signatures that can be created by this method is virtually infinite, is continuously changing (due to satellite orbital dynamics and U.S. Department of Defense imposed selective availability that dithers and degrades conventional code correlating GPS C/A receivers), is non-repeating and is everywhere unique. The output of the client authentication means changes every five milliseconds, so that even if a LSS response intercept did occur, the signature will be of no value to an adversary, because it becomes stale so rapidly. The host authentication server software has the ability to estimate the signature latency with an associated limited tolerance for transmission delays. Attempts at signature reuse will result in DGPS solution divergence that will produce no position result whatever. Attempts to "guess" signatures will face a combinatorial challenge of finding an acceptable string of 16 kilobits.

The security afforded by the invention is actually enhanced by the limitations placed on the broadcast GPS signals known as Selective Availability (SA), which other GPS receivers find as a limitation. The conventional GPS receiver user must either tolerate the 100 meter accuracy performance level or somehow correct the SA effects, such as with differential corrections services information input to the GPS navigation receiver. The SA policies intentionally degrade the satellite pseudo ranging signals by dithering the apparent distance between the satellites and the GPS receiver which results in a less accurate position solution that changes continuously. As a practical issue, it is not possible for an adversary to create a fraudulent version of future pseudo range values (or signatures) in order to spoof this invention to gain access. For example, if the DGPS process achieves 0.5 meter accuracy, the adversary attempting spoofing would require orbits whose accuracy would be 0.5 meter; this is not possible in real time.

b. Certain Procedures to Enhance Security

By use of certain procedures together with the basic invention, additional security can be achieved. Periodic or "continuous" authentication can be performed to ensure system integrity once host access is granted, to guard against the possibility that an adversary may have hijacked the channel after the initial, log-in authentication stage allowed client access to the host. A burst of LSS (GPS) raw data is used to initiate the geodetic authentication at log-in that allows the channel opening to the host. However, continuing communications carrying a low bit rate raw data stream transparent to the user can continue the authentication process on a periodic basis. This low bit rate continuous authentication can be implemented by transferring the 20 Hz sampling of the C/A channel raw data from the remote client LSS. While only a low bit rate sample is required, it may not be sufficient to confirm location within the same tight criteria as were used at log-in, unless the incidents of confirmation are several minutes apart. Thus, there is a trade-off between keeping the data size of the continuing sample used to confirm location small, and the precision of the confirmation calculation or the frequency with which a precise confirmation can be made.

The system can be used to protect networks in several different configurations, depending on the end user requirements. In the basic form, each remote site, whether an individual PC, workstation or a remote client/host server network, requires a LSS and client authentication means in order to gain access to a protected network through the host authentication server challenge. If both the host and the client are equipped with a LSS and authentication means, two-way authentication can be accomplished between protected network host servers and a client that also has the location signature challenge option and the ability to apply authentication criteria.

The file of client geodetic locations (latitude, longitude and height) that constitutes the authentication criteria that allows host access must be protected. Only the host server system manager (preferably two persons simultaneously acting) should have the authority to add or delete authenticated locations. As mentioned above, two other steps can be taken to help ensure the integrity of the authentication criteria. First, the authentication criteria can be encrypted. Second, the host authentication server geodetic location can be intentionally offset from the standard World Geodetic Datum. The differential baseline vector solution for the individual remote client locations would reflect that host bias. This bias would not be generally known and would make spoofing based on knowledge of the host's geodetic coordinates difficult.

c. Establishing Authentication Criteria for Fixed Client Entity

To be effective, the integrity of the authentication criteria used at the host authentication server must begin at the time these criteria are first established and continue thereafter. In the process of initial site registration, the host authentication server system manager will have a priori information on the approximate location of the client site to be registered. That a priori information might be as simple as the street address, which will allow the acquisition of approximate map coordinates. This map-based method could provide a horizontal position accuracy of perhaps 0.1 to 1 km.

For greater security, it is necessary to get a more accurate location as the basis for the authentication criteria for any client. To do this, a system installer will have a specialized equipment set that will contain a conventional C/A GPS receiver to determine the approximate LSS roof mounted position within 100 meters. The LSS would then be connected as if it were installed equipment for an interval of 1 to 24 hours with its data output being logged onto a laptop computer with one or more diskettes used to store these data. The data are then transferred electronically, package mailed or transferred to the host authentication server by conventional secure means. The host authentication server then processes these data from the client site and derives the baseline vector between the remote client and host authentication server with an accuracy of meters to millimeters as may be required to assure security. The resultant remote client site registration is then compared with the a priori site position from a map or C/A receiver derived data to verify the reasonableness of the coordinates before they become authentication criteria in the host authentication server database.

In an operational environment, the LSS device is installed and approximately positioned using a conventional C/A receiver to derive the geodetic position of the LSS antenna with 100 meter accuracy. Given such C/A receiver data as a priori constraints on the baseline vector, it is not necessary to process the Doppler observations to resolve the 293 m C/A cycle ambiguities. However, in the absence of the C/A receiver positioning data, the codeless state vector observations can be used to solve the baseline vector to a precision of a few meters. This result can be utilized for the location authentication function or can serve as the 29.3 meter ambiguity resolver for the P(Y) channel that will allow positioning with sub-meter precision.

As previously discussed in connection with FIG. 3b, another approach that is convenient but may be less secure is to permit the client to register by providing positional data as part of a log-in registration. This mode provides a method to register a site quickly with the host authentication server software. By selecting this mode, the client authentication means software accesses the host server and requests a site registration procedure. At this point the host server commands the receiver to perform a number of operations. The primary command is to transfer the buffered LSS data, so that the relative position can be estimated with 1 meter accuracy. This process will have a variable duration. For client sites known a priori within 100 meters, the position can be determined in less than one minute (depending upon the crosslink communications speed). For solutions starting with a uncertainty of 3 kilometers or more, between 4 and 6 minutes of data might be needed. This is dependent upon the simultaneous parameter estimation ability to converge, and the data crosslink rate.

d. Special Security Situations

In applications where a high density of users exist in a single facility, a single LSS can be used to authenticate all assigned users. The LSS would likely be integrated with the facility's network host server or gateway in this scenario. This application assumes that the integrity of a facility's physical security has not been compromised. A host authentication server challenge system can be configured to allow access to any authorized LSS device making it usable for Internet and enterprise network applications.

Operations in large office buildings present a special circumstance, because adequate sky visibility is restricted to only the roof area, electrical power may not be available there and coaxial cables are not likely available or impractical for installation. Only telephone lines may be available. In such a circumstance, the approach is to utilize existing copper telephone lines to simultaneously power the roof mounted LSS device and retrieve its signal output at one or more interior sites by way of the copper wire pair. For best security, however, the roof mounted LSS device would not produce a potentially interceptable, final, formatted digital message. Rather, it would be preferable to do only enough down conversion to produce a signal that could make use of the copper telephone lines, but leave the signal in somewhat raw analog form, so as to allow for the opportunity to introduce individual LSS device attributes for specific locations within the building in a final conversion stage. These attributes could be used to identify individual units within a building which shares a single LSS geodetic location.

There are also options to perform positioning with accuracies to the millimeter level, which will be subject to subtle errors induced by multipath signal reflections of the individual site surroundings. These have the effect of providing a unique signature for the authorized location that can be verified on challenge as a part of the LSS response. To implement the mm level system, it will be necessary to employ greater sophistication in the differential GPS methodology, which will require simultaneous reception of the L1 (1575.42 MHz) and L2 (1227.6 MHz) transmission bands from each of the GPS satellites being received. The codeless reception of the L1 and L2 bands will allow the direct calibration of the effects of the Earth's ionosphere which has the effect of causing errors in the baseline vector processing whose effects are a few meters at long distances. The ionosphere is highly variable and unpredictable, particularly when considering effects at the mm level between client and host server sites that are separated by hundreds of km. Thus, to reveal the purely multipath signature of a particular location, it is first necessary to remove the ionospheric errors. This is a fact that can be exploited to advantage for increased security in certain environments, since it brings into play yet another level of complexity that makes it very difficult for an adversary to spoof the signature. The millimeter level system will require higher than normal accuracy for satellite orbits.

It is also anticipated that a combined C/A code receiver with a codeless subsystem will have an advantage for authenticating a mobile client. The issue of a mobile client needing host access is a more challenging task than the fixed site to fixed site remote client/host server situation. A general motivation for using the invention is to remove the anonymity factor of the fraudulent actor who could come into a system from anywhere in the world. Also implicit in the invention concept is the notion that a legitimate user is willing to reveal the user's location to the host authentication server in the process of gaining access. In the normal fixed site deployed system, the location of a remote client can be determined in three dimensions and then registered for subsequent comparisons, in order to decide whether or not to grant access to the host or terminate the communications connection. However, the mobile user is by definition not at a fixed, previously known location and therefore cannot be registered.

One solution is to provide the authorized mobile client with special client authentication means that not only includes the components shown in FIGS. 1 and 4 but also includes a conventional C/A receiver and means for communicating its output (possessed positional data) along with the state vector observations from the LSS. By using the C/A receiver output of latitude/longitude and height, even if only correct within hundreds meters on the horizontal, together with the raw codeless state vector observations, the host authentication server can verify that the client is within hundreds meters of the location claimed by the C/A receiver. And both forms of data can be examined to see if the client location is at least geographically plausible (e.g., somewhere in a state or city). Because of the underlying notion in this authentication system that a legitimate user is willing to allow the user location to be known to the host server, a mobile client that fails to provide LSS data or LSS data that produce a plausible locational solution will be denied host access.

For certain mobile users, the authentication criteria may be somewhat different; some additional criteria can be applied. For example, for an aircraft or a plane with a known flight plan or travel path, the authentication criteria can be a series of geodetic positions combined with a velocity factor. Such a stream of data as would be generated by a traveling LSS would be very difficult to spoof.

VI. Code Correlation Embodiment

Figure 7:
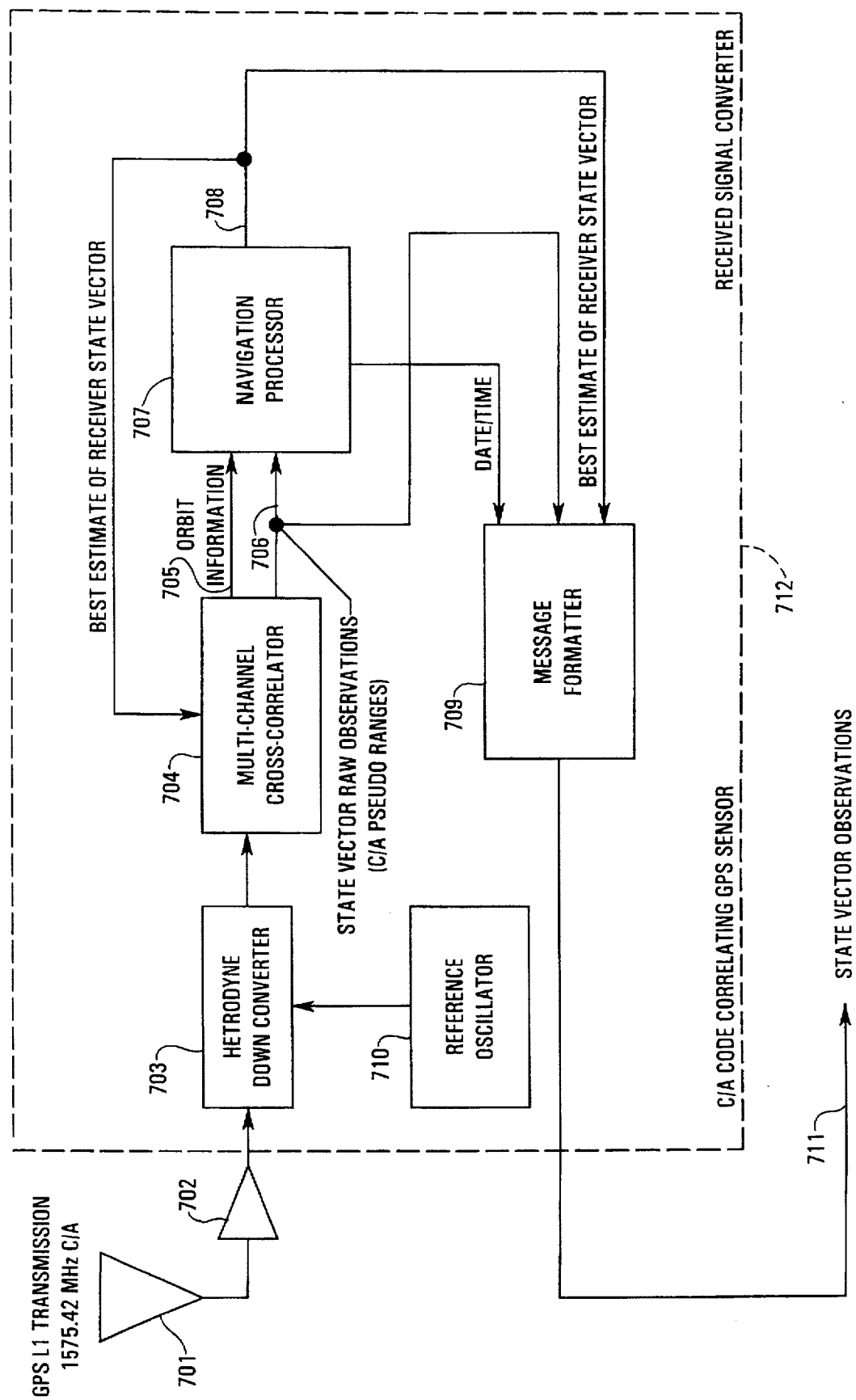
FIG. 7 is a schematic block diagram of the hardware in an LSS operating on code-correlating processing principles that prepares state vector observations for communication to a host authentication server

Although the preferred embodiment of the invention is based on codeless technology for capture of the state vector observations at the client LSS and any LSS associated with the host authentication server, conventional code correlation technology can also provide the basis for a location signature from a client. As shown in FIG. 7, a conventional code correlation GPS receiver 712 can be adapted to perform the location signature sensing function.

As seen in FIG. 7, the antenna 701, LNA 702 and heterodyne down converter 703 are the same as in FIG. 4. The output of the heterodyne down converter 703 is passed to a multi-channel cross-correlator 704. The cross-correlator 704 also receives as input the best estimate of the state vector for the client as calculated and fed back by a navigation processor 707. The multi-channel cross-correlator 704 can be commanded to output individual pseudo range measurements of all visible satellites. The outputs of the cross-correlator 704 are orbit information 705 and state vector observations in the form of C/A pseudo ranges 706, both of which are provided to the navigation processor 707. Each of the pseudo range measurements 706 output by the cross-correlator 704 will be effected by the SA dithering. The signature of the client is formed by time-tagged packets prepared by a message formatter 709 that receives as input: C/A pseudo ranges 706 from the GPS C/A receiver in the cross correlator 704; date/time information from the navigation processor 707; and the best estimate of the state vector for the client as calculated by navigation processor 707 (i.e., the multiple pseudo range values to the several visible satellites which are being tracked). These nearly raw observations are then transferred via channel 711 from the remote client 240 (140 in the single, client LSS version) upon the client being challenged by the host authentication server.

At the host authentication server site, the C/A GPS receiver derived pseudo ranges from the remote client location are compared with similar pseudo ranges derived at the host authentication server. Corresponding satellite pseudo ranges from the remote client and host authentication server GPS receivers are differenced at difference operator 513 to eliminate the SA dithering. A baseline vector solution between the host server and remote client is formed at state vector final processor 515 using the GPS orbit information either received from the real time broadcast or independently derived from orbit monitoring sites. Finally, in the comparator 518 the authentication criteria are applied to the state vector attributes that have been derived. If the remote client is at a pre-authorized location, host access is granted; otherwise the connection between the client authentication means and the host authentication server is terminated and a report is made of attempted fraudulent entry.

In this alternative code correlation approach, the state of the data that comprises the client signature is processed in order to derive pseudo range values at the remote client location prior to being transferred to the host authentication server upon the client being challenged. Because of this preprocessing at the client, the possibilities for spoofing are somewhat greater than with the raw data derived from the codeless compressed baseband signals.

The code correlation embodiment of the invention could, in addition to the C/A channel implementation discussed above, also be implemented with P(Y) channel code correlation or a combination of code correlation using the C/A and P(Y) channels. Also, the invention could be implemented with a combination of code correlation and codeless techniques.

VII. Message Authentication

In a variant on the challenge-response process that is used for authentication of a remote client seeking access to a host, the present invention can also be used to apply a geodetic label or postmark to a message that originates from or passes through a client site. The value of such a geodetic postmark is that it may be of use to a recipient (particularly the ultimate recipient) of the message to determine its authenticity.

In this variation of the invention, upon generation or receipt at a client of a message that calls for postmarking, LSS data is developed by an LSS at the client just as if it were for communication to a host entity in response to a challenge. The digitized packets of state vector observations are then inserted in the message. While many schemes are possible for placement of the postmark, as seen in FIG. 8, the LSS data postmark 803 can be inserted in message 800 after the header 801 but before the non-header content 805 of the message. To aid processing at the recipient, the post mark 803 can include not only state vector observations but also a name or station ID and a time stamp. The message bearing the postmark can then be transmitted. Any recipient who wishes to review the provenance of the message can apply to the postmark the same techniques that are discussed above to see if the message originates from a client that is recognizable under the authentication criteria that the recipient wishes to apply.

Postmarking of a message with a geodetic signature can be done at one or more client nodes through which a message passes. In fact, it could be required at each node through which a message passes.

In order to prevent someone from altering a message that has been postmarked, the message with its postmark can be digitally signed by the client, for example, using a public-key signature system. Alternatively, or in addition, it can be encrypted with a secret key known only by the client and intended recipient using a symmetric encryption algorithm. This also protects the message from unathorized disclosure or access. As a third possibility, the message can be used by the sensor in its production of the state vector observations data so that changes in the message would cause the state vector observations to become invalid. That is, a function of the message is used in the production of the state vector observations as these are associated with the message, whereby changes to the message cause the state vector observations to become invalid when a recipient of the message applies authentication criteria. This can be done, for example, by delaying the signals by an amount that is a function of the entire message.

As can be seen, this postmarking technique can be used for transaction authentication. If the postmark is applied at the originating node, such as the home computer of a person who wishes to make a bank account transfer or a credit card purchase, the party receiving the message can check the postmark upon receipt to determine the authenticity of the message. Thus, here the signature is not used as a password for access to a host but rather as a password that the host, having granted access, will use to determine whether the message is authentic and should be acted upon.

VIII. Variations

Although the description of the preferred embodiment has been presented, it is contemplated that various changes could be made without deviating from the spirit of the present invention. For example, although the preferred form of invention has been described specifically in connection with the NAVSTAR Global Positioning System, it is readily conformable for use with other Earth-orbiting, signal-transmitting satellites, such as, the Global Navigation Satellite System of the former U.S. S. R. See, "GLONASS and GPS: Prospects for a Partnership", N. E. Ivanov and V. Salistchev, Publication Reference, GPS World, Vol. 2, No. 4, April, 1991.

It is therefore to be understood that while a preferred form of method and apparatus has been herein set forth and described, various modifications and changes may be made without departing from the spirit and scope of the present invention as defined by the appended claims and reasonable equivalents thereof.

What is claimed as new and desired to be protected by Letters Patent is:

1. A system for determining the authenticity of a client seeking access to a host comprising:

a client authentication device, comprising:

first sensor locationally associated with the client for sensing transmissions from two or more signal sources that produce constantly changing transmissions containing information sufficient to derive a state vector that identifies the client location. said first sensor including a converter for converting the sensed transmissions into first state vector observations for communication to an authentication server associated with the host, and circuitry for communicating the first state vector observations to the host authentication server; and wherein the host authentication server, comprises:
an authentication processor for receiving and processing the first state vector observations and for comparing one or more attributes of the state vector contained in the first state vector observations to predetermined authentication criteria, and circuitry for developing a user authentication signal when the one or more attributes of the first state vector observations satisfy the predetermined authentication criteria.

2. A system as recited in claim 1. further comprising:
second sensor at a predefined different location than the first sensor for sensing transmissions from the same two or more signal sources sensed by the first sensor that produce transmissions containing information sufficient to derive a state vector for the predefined different location, including a converter for converting the sensed transmissions to second state vector observations for communication to the host authentication server;
circuitry for communicating the second state vector observations to the host authentication server, said host authentication server having a processor for receiving and processing the second state vector observations and for preparing a differential state vector from the first and second state vector observations and comparing one or more attributes of the differential state vector to predefined authentication criteria; and
circuitry for developing a user authentication signal when the one or more attributes of the differential state vector satisfy the predefined authentication criteria.

3. A system as recited in claim 2, wherein the second sensor is located at the host.

4. A system as recited in claim 2, wherein the second sensor is located at a site different from the host.

5. A system as recited in claim 1, wherein the first sensor uses codeless techniques to convert the sensed transmissions into first state vector observations.

6. A system as recited in claim 2, wherein the second sensor uses codeless techniques to convert the sensed transmissions into first state vector observations.

7. A system as recited in claim 2, wherein the first sensor and the second sensor use codeless techniques to convert the sensed transmissions into state vector observations.

8. A system as recited in claim 1, wherein the authentication criteria comprise the geodetic location of the client.

9. A system as recited in claim 1, wherein the authentication criteria comprise the latitude and longitude of the client.

10. A system as recited in claim 1, wherein the authentication criteria comprise the latitude, longitude and height of the client.

11. A system as recited in claim 1, wherein the authentication criteria comprise the latitude, longitude and height of the client and a non-zero velocity of the client.

12. A system as recited in claim 1, wherein the authentication criteria comprise the geodetic location of the client with an offset from a standard geodetic reference system.

13. A system as recited in claim 1, wherein the authentication criteria comprise the geodetic location of the client and the authentication criteria are stored in encrypted form.

14. A system as recited in claim 1, wherein the first state vector observations are compressed relative to the transmissions actually sensed by the first sensor.

15. A system as recited in claim 1, wherein the first state vector observations are compressed relative to the transmissions actually sensed by the first sensor and the circuitry for communicating the first state vector observations to the authentication server communicates the transmissions sensed for a real time interval of X duration in a transmission to the authentication server having a real time duration less than X.

16. A system as recited in claim 1, wherein the first state vector observations are compressed relative to the transmissions actually sensed by the first sensor in a ratio of at least 100,000 to 1.

17. A system as recited in claim 1, wherein the first sensor uses code correlation techniques to convert the sensed transmissions into first state vector observations.

18. A system for applying to an electronic message existing at a client location and intended for a destination information for determining the authenticity of that message comprising:
a sensor locationally associated with the client for sensing transmissions from two or more signal sources that produce transmissions containing information sufficient to derive a state vector that identifies the client location, said sensor including a converter for converting the sensed transmissions into state vector observations for communication to the destination;
circuitry for associating with the message the sensed state vector observations from the sensor; and
circuitry for sending the message towards its destination with the sensed state vector observations.

19. A system as recited in claim 18 wherein the message with associated state vector observations is digitally signed.

20. A system as recited in claim 18 wherein the message with associated state vector observations is encrypted.

21. A system as recited in claim 18 wherein the message with associated state vector observations is digitally signed and encrypted.

22. A system as recited in claim 18 wherein the message requests a financial transaction.

23. A system as recited in claim 22 wherein the financial transaction is a transfer from one account to another.

24. A system as recited in claim 18 wherein the message is sent by a payor and requests a debit of an account of the payor.

25. A system as recited in claim 18 wherein a function of the message is used in the production of the state vector observations as these are associated with the message, whereby changes to the message cause the state vector observations to become invalid.

26. A method for determining the authenticity of a client seeking access to a host comprising:
at a client authentication device:
sensing at a first sensor locationally associated with the client transmissions from two or more signal sources that produce constantly changing transmissions containing information sufficient to derive a state vector that identifies the client location;
converting the sensed transmissions into first state vector observations for communication to an authentication server associated with the host; and
communicating the first state vector observations to the host authentication server; and at the host authentication server:

receiving and processing the first state vector observations;

comparing one or more attributes of the state vector contained in the first state vector observations to predetermined authentication criteria; and developing a user authentication signal when the one or more attributes of the first state vector observations satisfy the predetermined authentication criteria.

27. A method as recited in claim 26, further comprising:

at a predefined different location than the first sensor:

sensing transmissions from the same two or more signal sources sensed by the first sensor that produce transmissions containing information sufficient to derive a state vector for the predefined different location;

converting the sensed transmissions to second state vector observations for communication to the host authentication server; and communicating the second state vector observations to the host authentication server; and at the host authentication server:

receiving and processing the second state vector observations;

preparing a differential state vector from the first and second state vector observations;

comparing one or more attributes of the differential state vector to predefined authentication criteria; and developing a user authentication signal when the one or more attributes of the differential state vector satisfy the predefined authentication criteria.

28. A method for applying to an electronic message existing at a client location and intended for a destination information for determining the authenticity of that message comprising:

sensing at a sensor locationally associated with the client transmissions from two or more signal sources that produce transmissions containing information sufficient to derive a state vector that identifies the client location;

converting the sensed transmissions into state vector observations for communication to the destination;

associating with the message the sensed state vector observations from the sensor; and sending the message towards its destination with the sensed state vector observations.

* * * * *